(12) United States Patent
Shin et al.

(10) Patent No.: US 11,963,230 B2
(45) Date of Patent: Apr. 16, 2024

(54) METHOD AND DEVICE FOR TRANSMITTING AND RECEIVING SIGNAL IN WIRELESS COMMUNICATION SYSTEM

(71) Applicant: LG ELECTRONICS INC., Seoul (KR)

(72) Inventors: Seokmin Shin, Seoul (KR); Suckchel Yang, Seoul (KR); Seonwook Kim, Seoul (KR); Joonkui Ahn, Seoul (KR); Changhwan Park, Seoul (KR); Seunggye Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 361 days.

(21) Appl. No.: 17/310,541

(22) PCT Filed: Mar. 27, 2020

(86) PCT No.: PCT/KR2020/004228
§ 371 (c)(1),
(2) Date: Aug. 10, 2021

(87) PCT Pub. No.: WO2020/197329
PCT Pub. Date: Oct. 1, 2020

(65) Prior Publication Data
US 2022/0070939 A1 Mar. 3, 2022

(30) Foreign Application Priority Data
Mar. 28, 2019 (KR) .................. 10-2019-0036390
Jul. 12, 2019 (KR) .................. 10-2019-0084801

(51) Int. Cl.
*H04W 74/08* (2009.01)
*H04L 27/26* (2006.01)
*H04W 74/0833* (2024.01)

(52) U.S. Cl.
CPC ..... *H04W 74/0833* (2013.01); *H04L 27/2605* (2013.01)

(58) Field of Classification Search
CPC ......... H04W 74/0833; H04W 72/1268; H04W 74/004; H04L 27/2605; H04L 27/2614;
(Continued)

(56) References Cited

U.S. PATENT DOCUMENTS 11,546,862 B2 * 1/2023 Babaei ............... H04W 52/146
2011/0249549 A1 10/2011 Hao et al.
(Continued)

FOREIGN PATENT DOCUMENTS

KR    20180084669    7/2018
WO    2016122120    8/2016

OTHER PUBLICATIONS

PCT International Application No. PCT/KR2020/004228, International Search Report dated Jul. 13, 2020, 18 pages.
(Continued)

*Primary Examiner* — Brian T O Connor
(74) *Attorney, Agent, or Firm* — LEE, HONG, DEGERMAN, KANG & WAIMEY

(57) ABSTRACT

A method and device for transmitting and receiving a signal in a wireless communication system according to an embodiment of the present disclosure includes: transmitting a physical random access channel (PRACH); and receiving a random access response (RAR) on the basis of the PRACH, wherein the MACH is composed of N_MAX sequences mapped on the frequency domain, the N_MAX sequences are formed of M groups each including N sequences, the N_MAX sequences have the same length, the N_MAX sequences are generated on the basis of the same base sequence; the N sequences respectively have different
(Continued)

cyclic shift (CS) values applied thereto; and the pattern of the different CS values may be the same for the M groups.

6 Claims, 25 Drawing Sheets

(58) Field of Classification Search
CPC . H04L 27/2613; H04L 5/0051; H04L 27/261; H04J 13/00
See application file for complete search history.

(56) References Cited

U.S. PATENT DOCUMENTS

| | | | |
|---|---|---|---|
| 2017/0135052 A1* | 5/2017 | Lei | H04W 16/32 |
| 2017/0366328 A1* | 12/2017 | Seo | H04L 5/0051 |
| 2018/0199359 A1* | 7/2018 | Cao | H04L 1/1896 |
| 2020/0136655 A1* | 4/2020 | Shen | H03M 13/13 |
| 2021/0044981 A1* | 2/2021 | Bhattad | H04J 13/18 |

OTHER PUBLICATIONS

Huawei et al., "PRACH preamble sequences and formats for capacity enhancement and beam management," R1-1709917, 3GPP TSG RAN WG1 NR Ad Hoc Meeting, Jun. 2017, 19 pages.
Huawei et al., "PRACH preamble sequences and formats for capacity enhancement and beam management," R1-1711600, 3GPP TSG RAN WG1 NR AdHoc Meeting, Jun. 2017, 21 pages.

* cited by examiner

[Fig. 1]
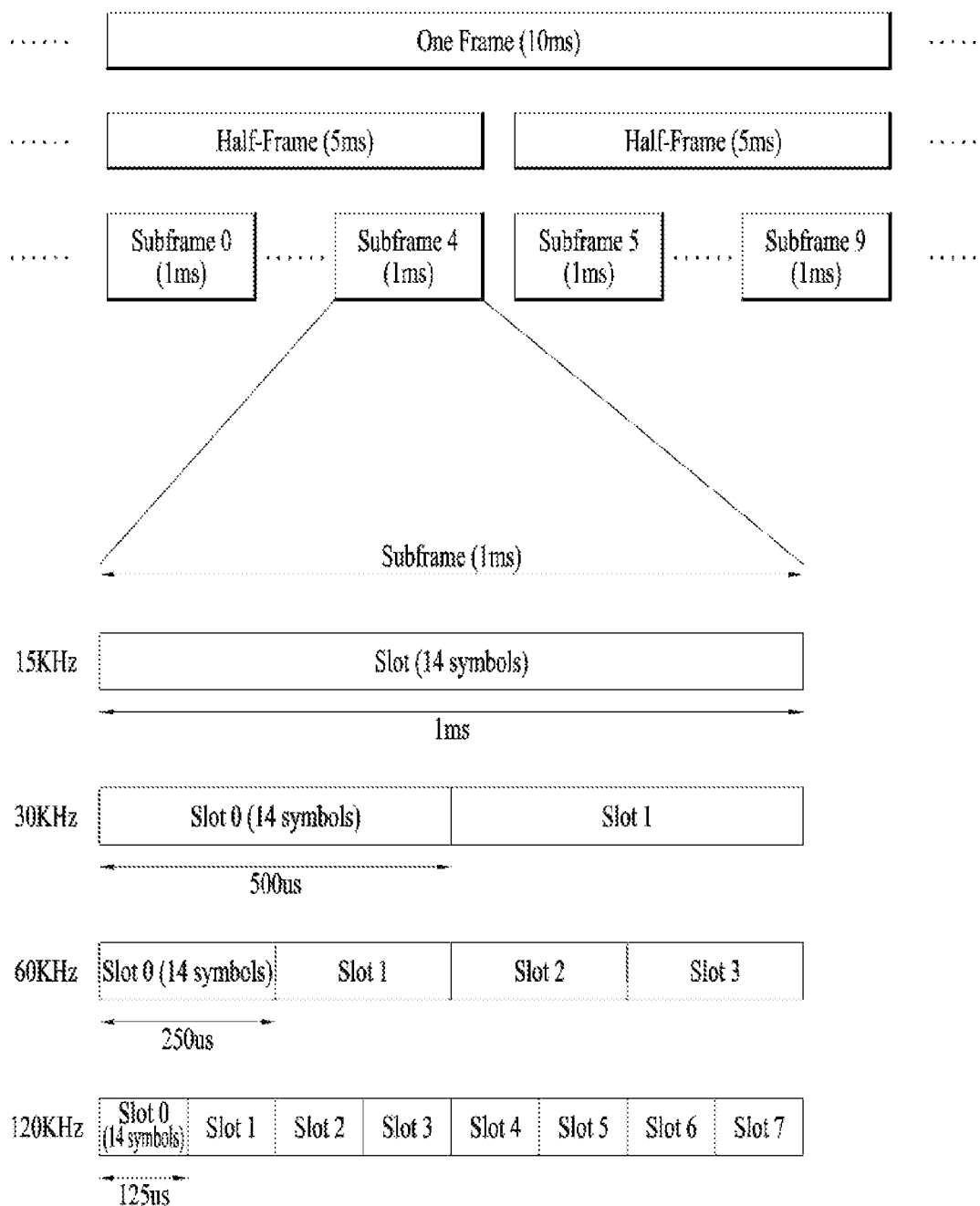

[Fig. 2]
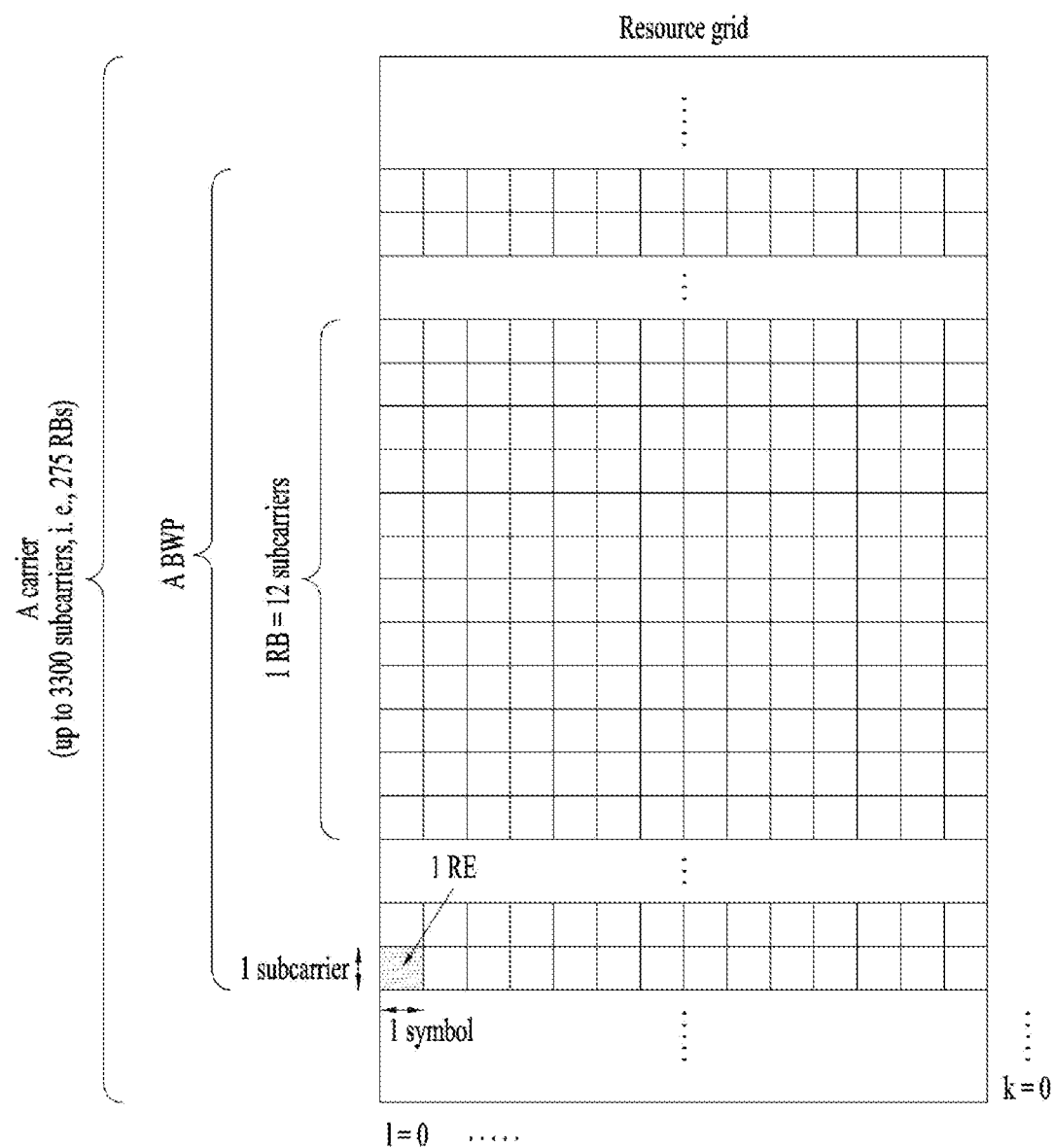

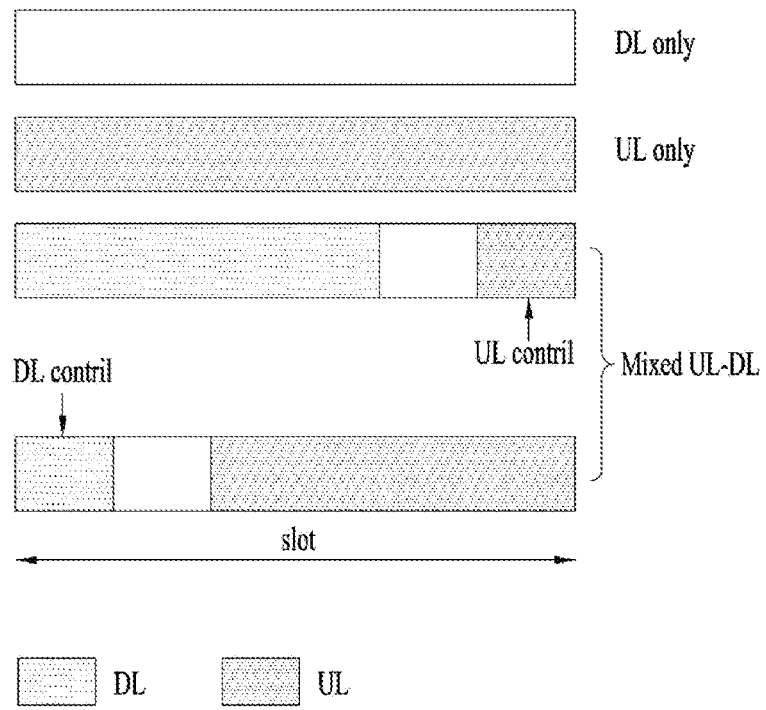
[Fig. 3]

[Fig. 4]
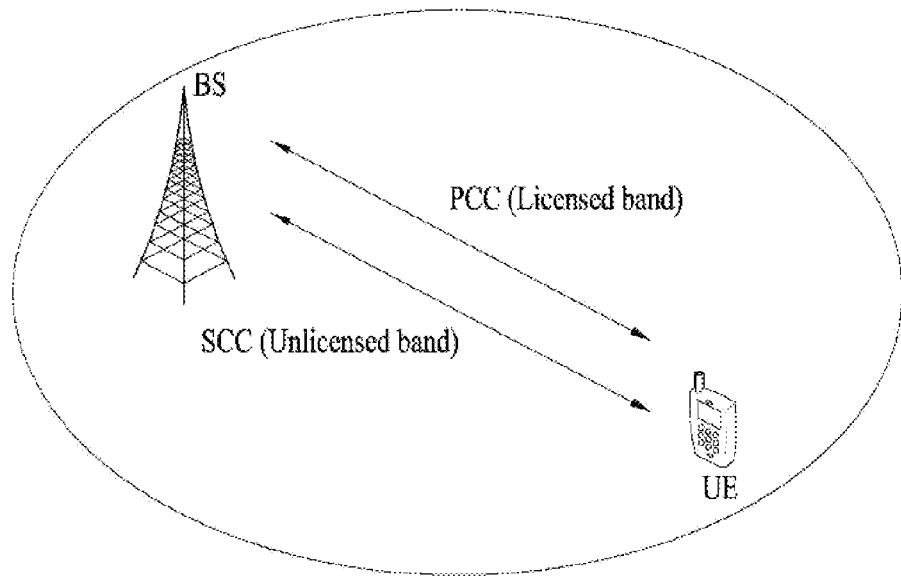
(a) Carrier aggregation between L-band and U-band
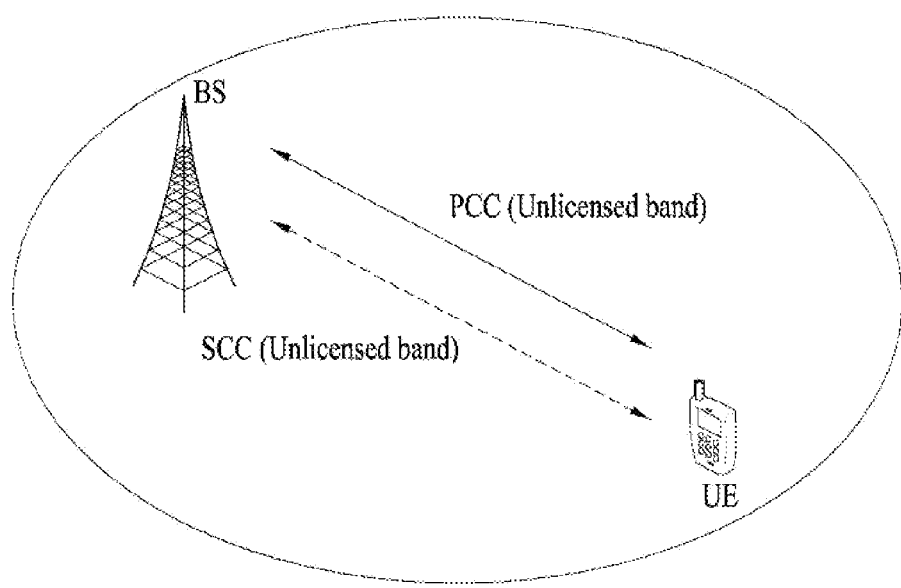
(b) Standalone U-band(s)

[Fig. 5]
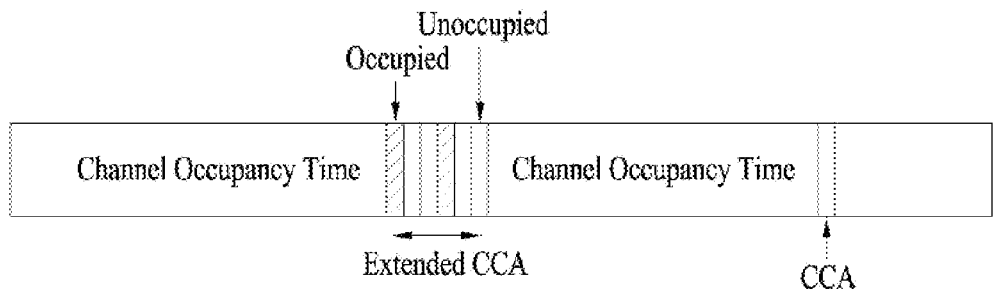
[Fig. 6]
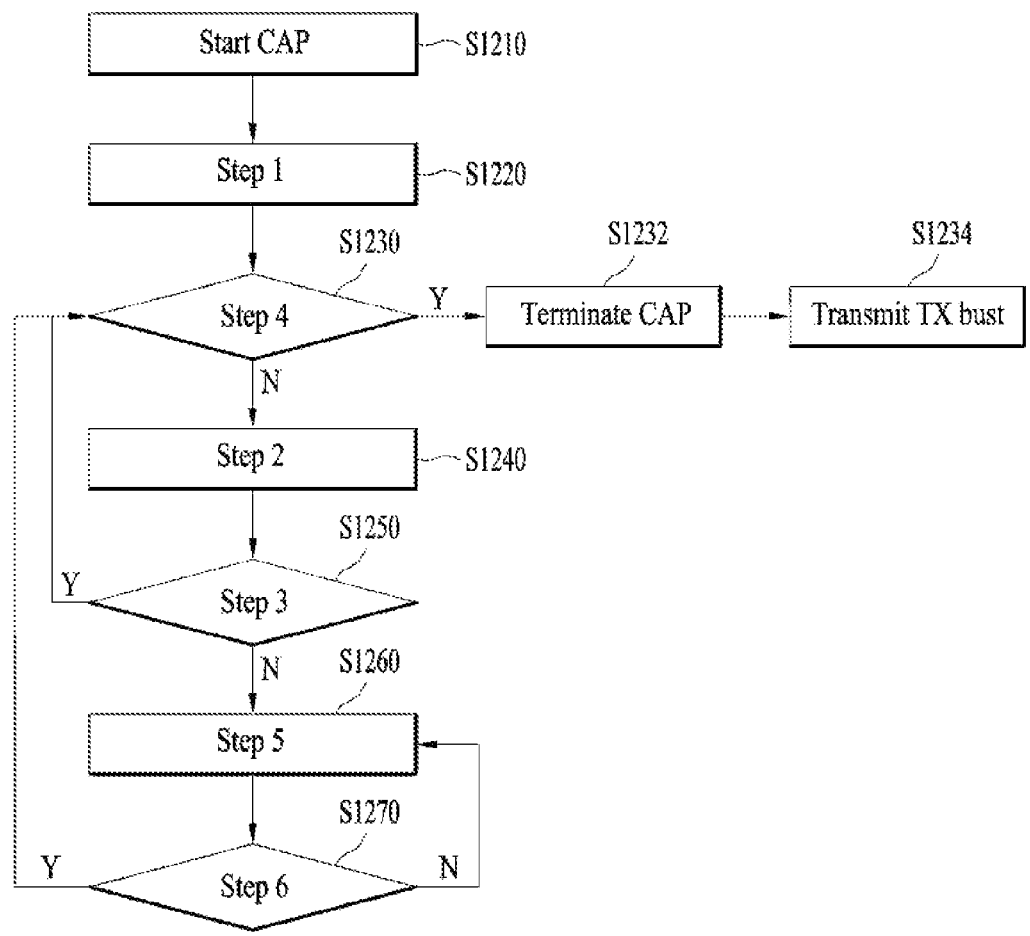

[Fig. 7]
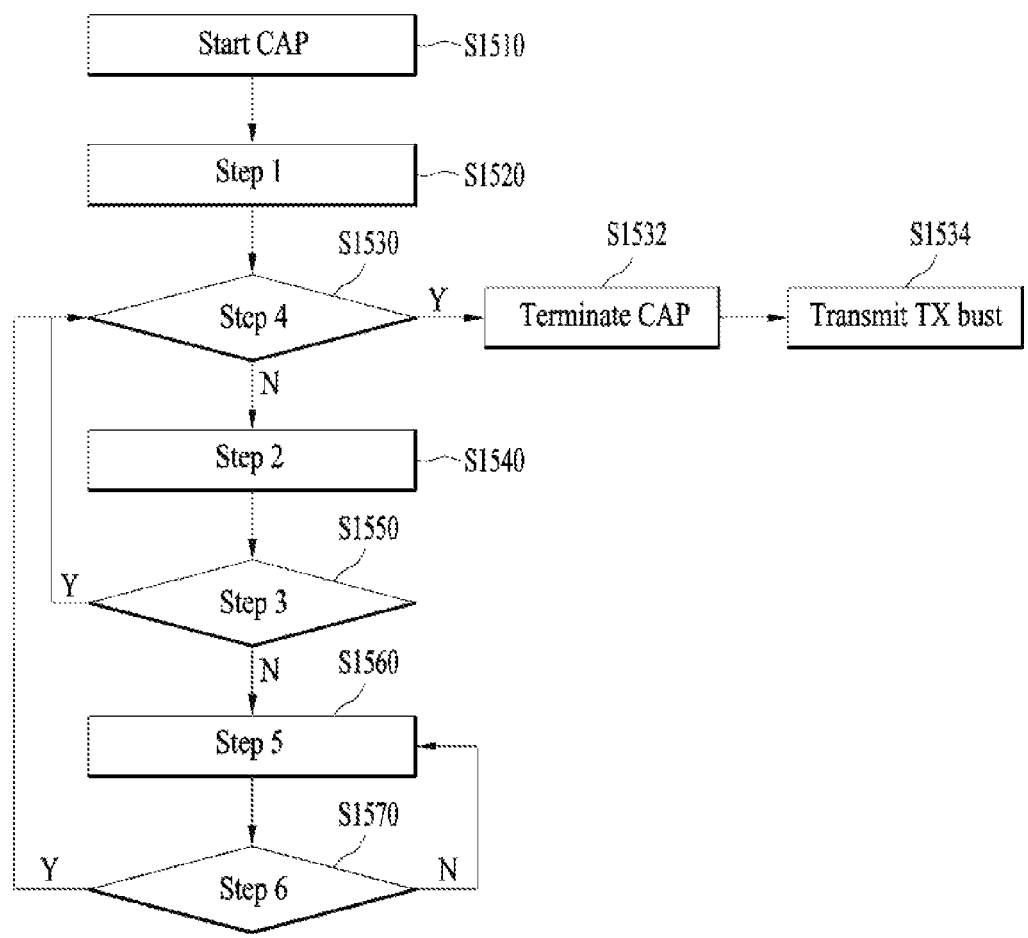

[Fig. 8]
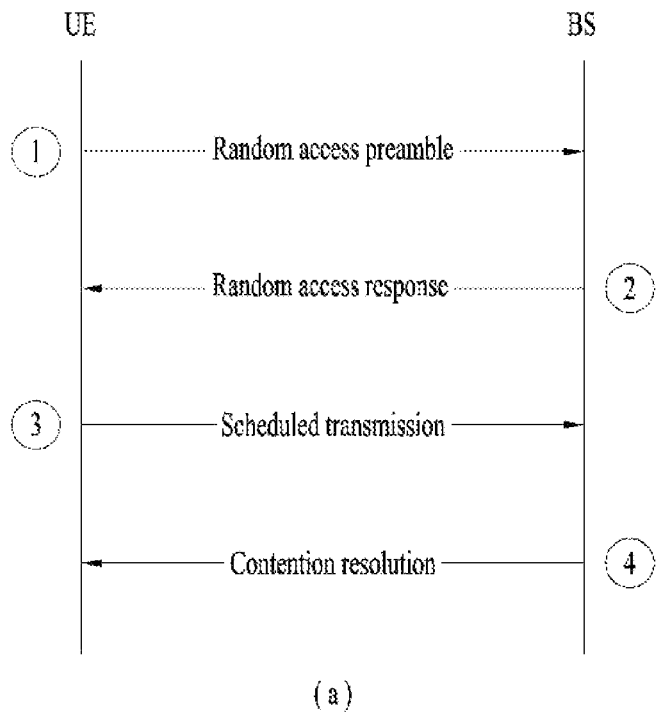
(a)
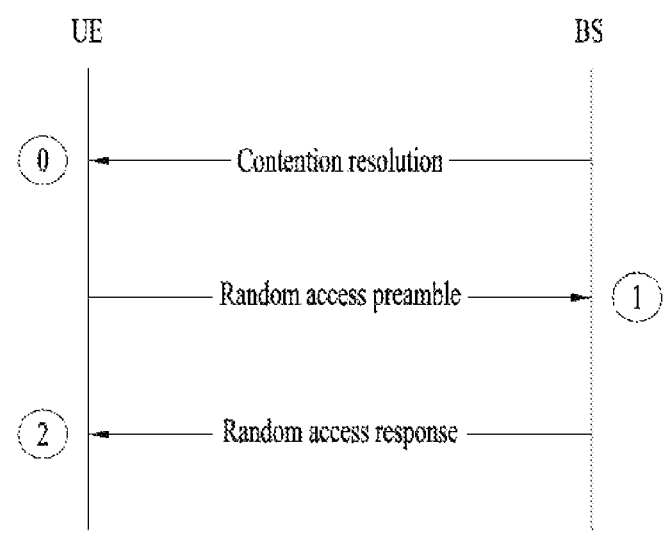
(b)

【Fig. 9】
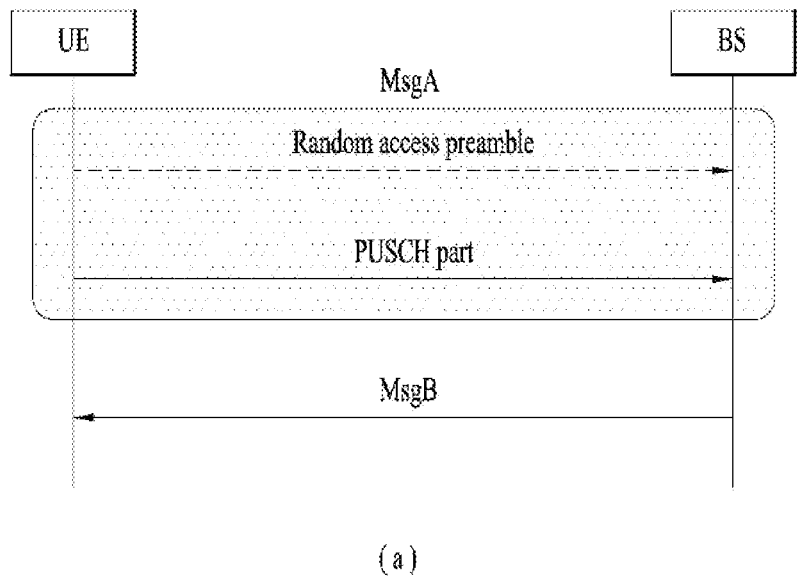
(a)
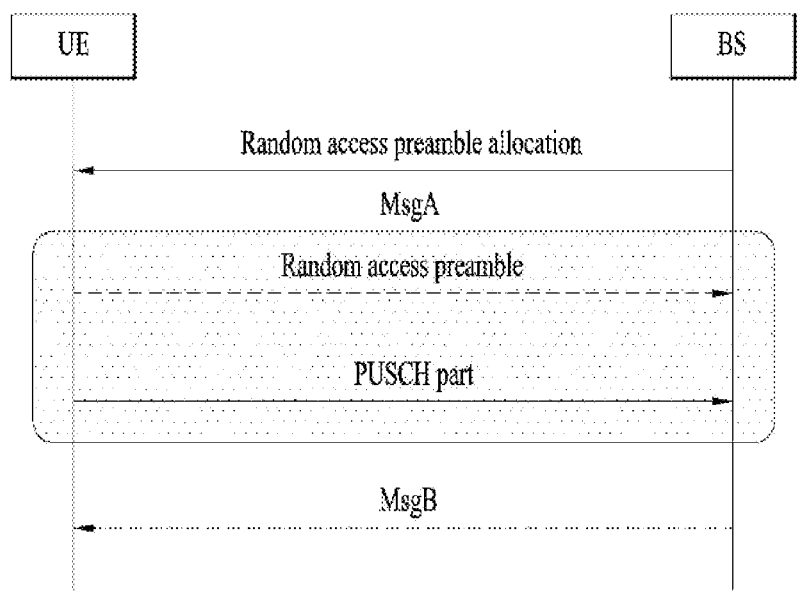
(b)

[Fig. 10]
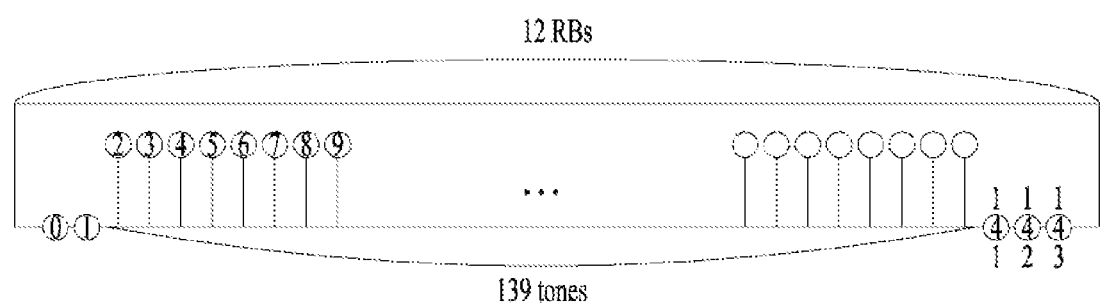

[Fig. 11]
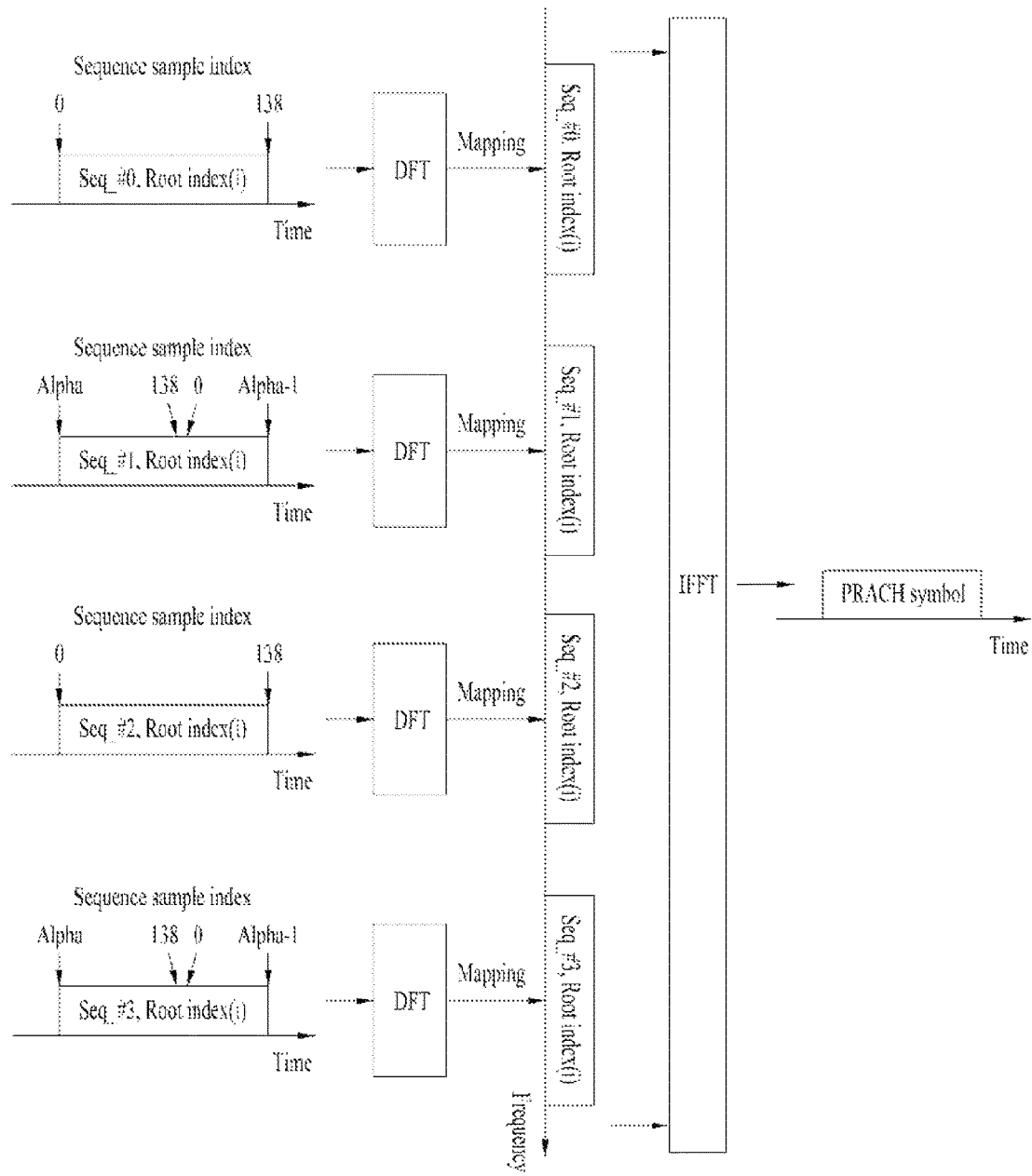

[Fig. 12]
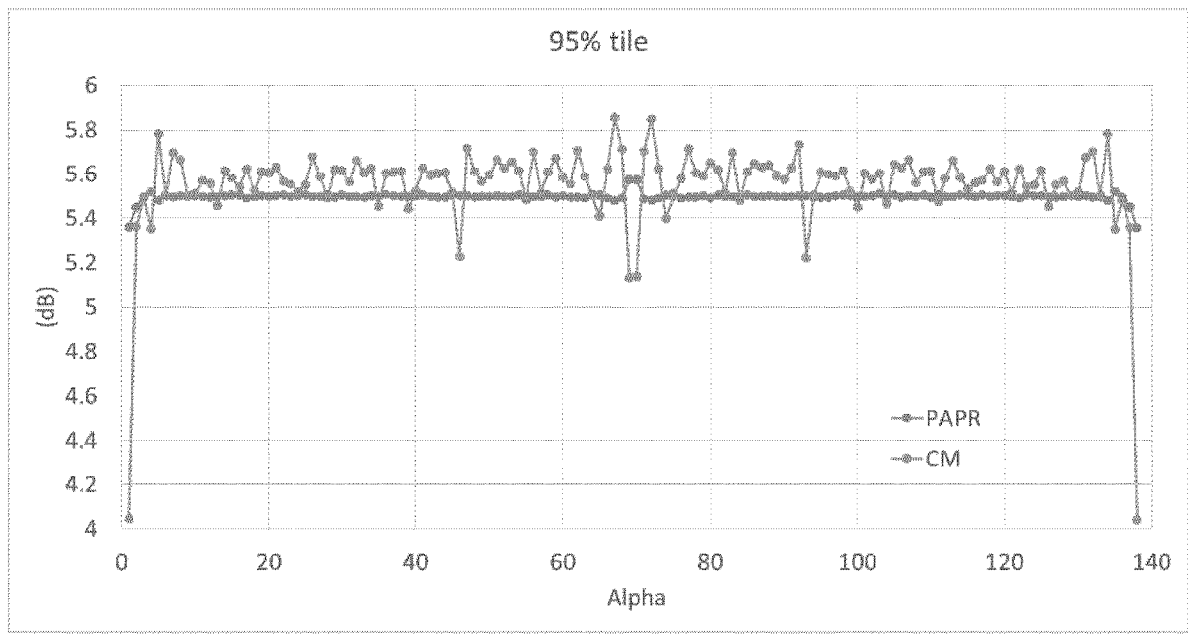

[Fig. 13]

| Index | cs R1 | cs R2 | cs R3 | cs R4 | ps R1 | ps R2 | ps R3 | ps R4 | PAPR (dB) | CM (dB) |
|---|---|---|---|---|---|---|---|---|---|---|
| 242 | 0 | 0 | 1 | 1 | 1+0i | 0-1i | 1+0i | 0+1i | 3.433 | 1.803 |
| 341 | 0 | 1 | 0 | 1 | 1+0i | 0+1i | 0+1i | 1+0i | 3.433 | 1.804 |
| 368 | 0 | 1 | 0 | 1 | 1+0i | -1+0i | 0+1i | 0-1i | 3.434 | 1.805 |
| 195 | 0 | 0 | 1 | 1 | 1+0i | 1-0i | 1+0i | -1+0i | 3.433 | 1.805 |
| 370 | 0 | 1 | 0 | 1 | 1+0i | 0-1i | 1+0i | 0+1i | 3.433 | 1.805 |
| 218 | 0 | 0 | 1 | 1 | 1+0i | 0+1i | -1+0i | 0+1i | 3.435 | 1.806 |
| 328 | 0 | 1 | 0 | 1 | 1+0i | 1+0i | 0+1i | 0-1i | 3.433 | 1.806 |
| 353 | 0 | 1 | 0 | 1 | 1+0i | -1+0i | 1+0i | 1+0i | 3.435 | 1.806 |
| 329 | 0 | 1 | 0 | 1 | 1+0i | 0+1i | -1+0i | 1+0i | 3.433 | 1.807 |
| 363 | 0 | 1 | 0 | 1 | 1+0i | 0+1i | -1+0i | -1+0i | 3.433 | 1.807 |
| 323 | 0 | 1 | 0 | 1 | 1+0i | 0+1i | 1+0i | -1+0i | 3.433 | 1.808 |
| 340 | 0 | 1 | 0 | 1 | 1+0i | -1+0i | 1+0i | 0-1i | 3.435 | 1.808 |
| 351 | 0 | 1 | 0 | 1 | 1+0i | 1+0i | 0-1i | -1+0i | 3.433 | 1.808 |
| 212 | 0 | 0 | 1 | 1 | 1+0i | 0+1i | 1+0i | 0-1i | 3.435 | 1.809 |
| 225 | 0 | 0 | 1 | 1 | 1+0i | -1+0i | 1+0i | 1+0i | 3.433 | 1.809 |
| 346 | 0 | 1 | 0 | 1 | 1+0i | 0+1i | -1+0i | 0+1i | 3.433 | 1.809 |
| 201 | 0 | 0 | 1 | 1 | 1+0i | 1+0i | -1+0i | 1+0i | 3.433 | 1.811 |
| 381 | 0 | 1 | 0 | 1 | 1+0i | 0-1i | 0-1i | 1+0i | 3.435 | 1.811 |
| 380 | 0 | 1 | 0 | 1 | 1+0i | 0-1i | -1+0i | 0-1i | 3.435 | 1.812 |
| 375 | 0 | 1 | 0 | 1 | 1+0i | 0-1i | 0+1i | -1+0i | 3.433 | 1.813 |
| 235 | 0 | 0 | 1 | 1 | 1+0i | -1+0i | -1+0i | -1+0i | 3.433 | 1.814 |
| 252 | 0 | 0 | 1 | 1 | 1+0i | 0-1i | -1+0i | 0-1i | 3.435 | 1.814 |
| 334 | 0 | 1 | 0 | 1 | 1+0i | 1+0i | 0-1i | 0+1i | 3.433 | 1.814 |
| 358 | 0 | 1 | 0 | 1 | 1+0i | -1+0i | 0+1i | 0+1i | 3.435 | 1.816 |
| 247 | 0 | 0 | 1 | 1 | 1+0i | 0-1i | 0+1i | 0+1i | 3.435 | 2.043 |
| 200 | 0 | 0 | 1 | 1 | 1+0i | 1+0i | 0+1i | 0-1i | 3.433 | 2.044 |
| 213 | 0 | 0 | 1 | 1 | 1+0i | 0+1i | 0+1i | 1+0i | 3.437 | 2.044 |
| 253 | 0 | 0 | 1 | 1 | 1+0i | 0-1i | 0-1i | 1+0i | 3.433 | 2.044 |
| 240 | 0 | 0 | 1 | 1 | 1+0i | -1+0i | 0-1i | 0-1i | 3.433 | 2.046 |
| 230 | 0 | 0 | 1 | 1 | 1+0i | -1+0i | 0+1i | 0+1i | 3.433 | 2.047 |

[Fig. 14]

| Index | cs R1 | cs R2 | cs R3 | cs R4 | ps R1 | ps R2 | ps R3 | ps R4 | PAPR (dB) | CM (dB) |
|---|---|---|---|---|---|---|---|---|---|---|
| 341 | 0 | 1 | 0 | 1 | 1+0i | 0+1i | 0+1i | 1+0i | 3.433 | 1.805 |
| 242 | 0 | 0 | 1 | 1 | 1+0i | 0-1i | 1+0i | 0+1i | 3.435 | 1.806 |
| 368 | 0 | 1 | 0 | 1 | 1+0i | -1+0i | 0-1i | 0-1i | 3.433 | 1.806 |
| 201 | 0 | 0 | 1 | 1 | 1+0i | 1+0i | -1 | 1+0i | 3.433 | 1.807 |
| 212 | 0 | 0 | 1 | 1 | 1+0i | 0+1i | 1+0i | 0-1i | 3.435 | 1.807 |
| 235 | 0 | 0 | 1 | 1 | 1+0i | -1+0i | -1+0i | -1+0i | 3.435 | 1.807 |
| 375 | 0 | 1 | 0 | 1 | 1+0i | 0-1i | 0+1i | -1+0i | 3.433 | 1.807 |
| 328 | 0 | 1 | 0 | 1 | 1+0i | 1+0i | 0+1i | 0-1i | 3.435 | 1.808 |
| 351 | 0 | 1 | 0 | 1 | 1+0i | 0+1i | 0-1i | -1+0i | 3.433 | 1.809 |
| 358 | 0 | 1 | 0 | 1 | 1+0i | -1+0i | 0+1i | 0+1i | 3.435 | 1.81 |
| 340 | 0 | 1 | 0 | 1 | 1+0i | 0+1i | 1+0i | 0-1i | 3.437 | 1.811 |
| 329 | 0 | 1 | 0 | 1 | 1+0i | 1+0i | -1+0i | 1+0i | 3.437 | 1.812 |
| 334 | 0 | 1 | 0 | 1 | 1+0i | 1+0i | 0-1i | 0+1i | 3.433 | 1.812 |
| 370 | 0 | 1 | 0 | 1 | 1+0i | 0-1i | 1+0i | 0+1i | 3.437 | 1.812 |
| 252 | 0 | 0 | 1 | 1 | 1+0i | 0-1i | -1+0i | 0-1i | 3.435 | 1.813 |
| 346 | 0 | 1 | 0 | 1 | 1+0i | 0+1i | -1+0i | 0+1i | 3.433 | 1.813 |
| 353 | 0 | 1 | 0 | 1 | 1+0i | -1+0i | 1+0i | 1+0i | 3.431 | 1.813 |
| 363 | 0 | 1 | 0 | 1 | 1+0i | -1+0i | -1+0i | -1+0i | 3.437 | 1.813 |
| 380 | 0 | 1 | 0 | 1 | 1+0i | 0-1i | -1+0i | 0-1i | 3.433 | 1.813 |
| 381 | 0 | 1 | 0 | 1 | 1+0i | 0-1i | 0-1i | -1+0i | 3.435 | 1.813 |
| 218 | 0 | 0 | 1 | 1 | 1+0i | 0+1i | -1+0i | -1+0i | 3.435 | 1.814 |
| 323 | 0 | 1 | 0 | 1 | 1+0i | 0-1i | -1+0i | 0+1i | 3.433 | 1.814 |
| 225 | 0 | 0 | 1 | 1 | 1+0i | 1+0i | 1+0i | 1+0i | 3.435 | 1.815 |
| 195 | 0 | 0 | 1 | 1 | 1+0i | -1+0i | 1+0i | -1+0i | 3.433 | 1.817 |
| 247 | 0 | 0 | 1 | 1 | 1+0i | 1+0i | 1+0i | -1+0i | 3.435 | 2.057 |
| 206 | 0 | 0 | 1 | 1 | 1+0i | 1+0i | 0-1i | 0+1i | 3.435 | 2.059 |
| 213 | 0 | 0 | 1 | 1 | 1+0i | 0+1i | 0+1i | 1+0i | 3.435 | 2.059 |
| 240 | 0 | 0 | 1 | 1 | 1+0i | -1+0i | 0-1i | 0-1i | 3.435 | 2.06 |
| 253 | 0 | 0 | 1 | 1 | 1+0i | 0-1i | 0-1i | 1+0i | 3.435 | 2.06 |
| 200 | 0 | 0 | 1 | 1 | 1+0i | 1+0i | 0+1i | 0-1i | 3.435 | 2.062 |

[Fig. 15]
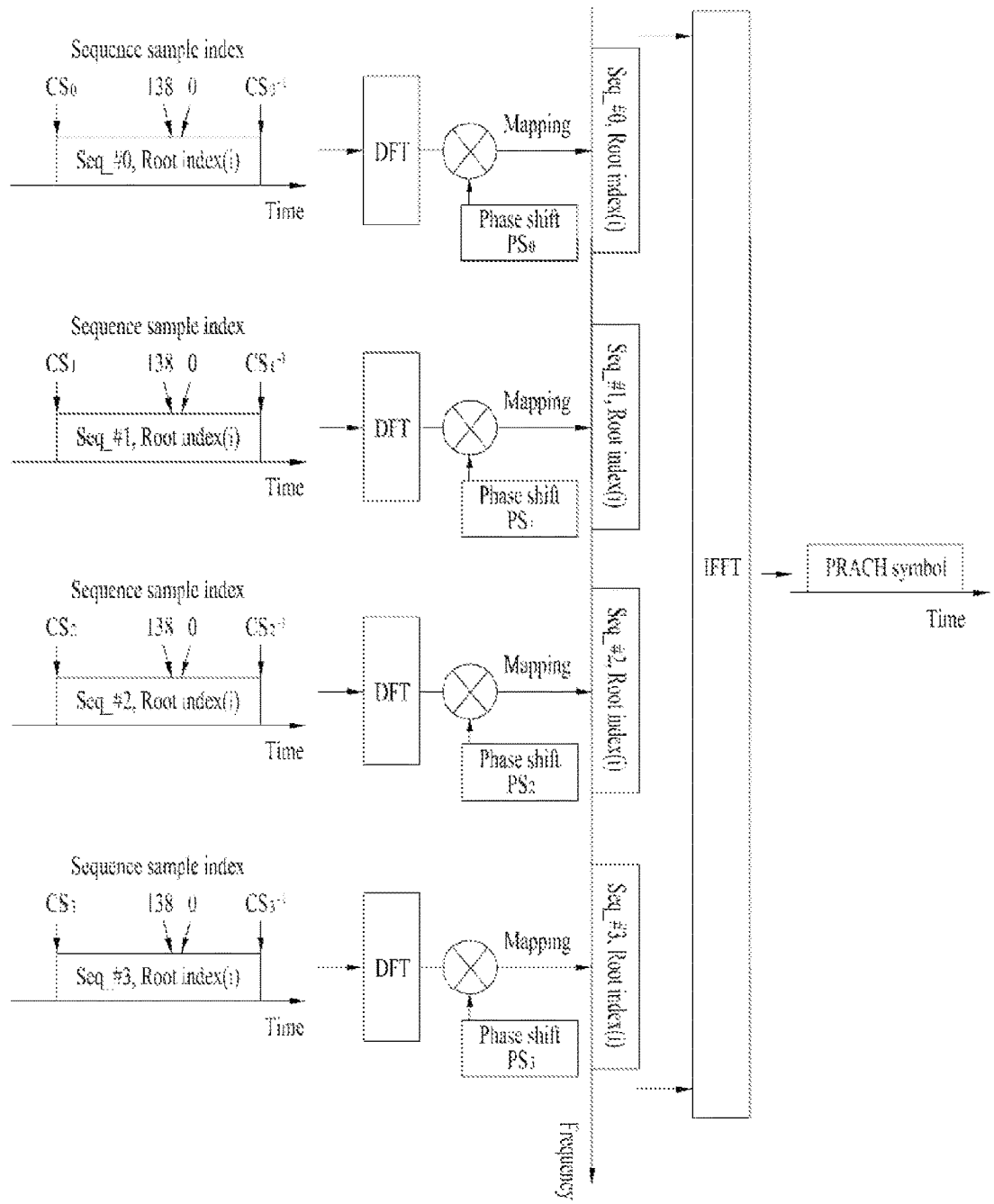

[Fig. 16]
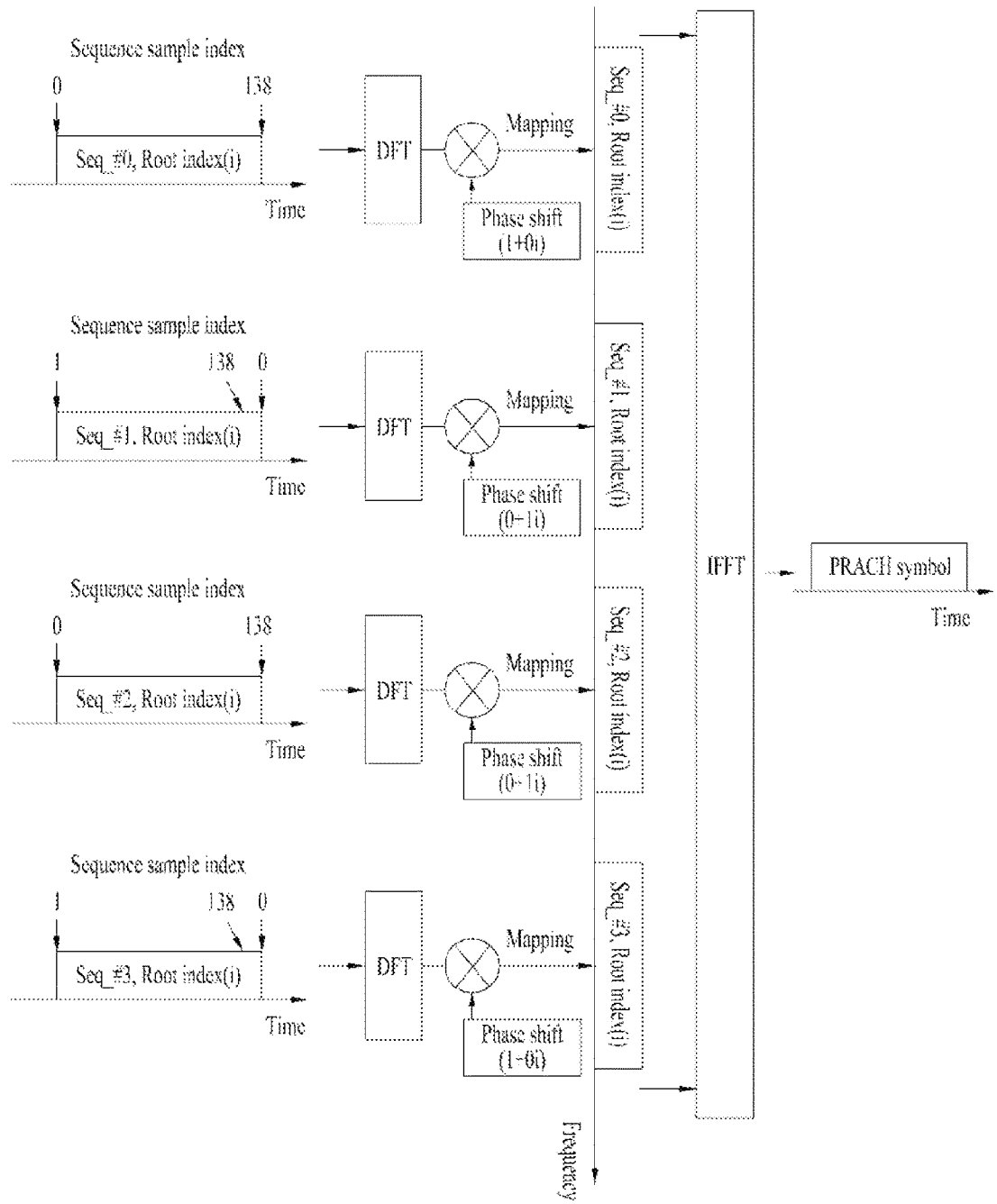

[Fig. 17]
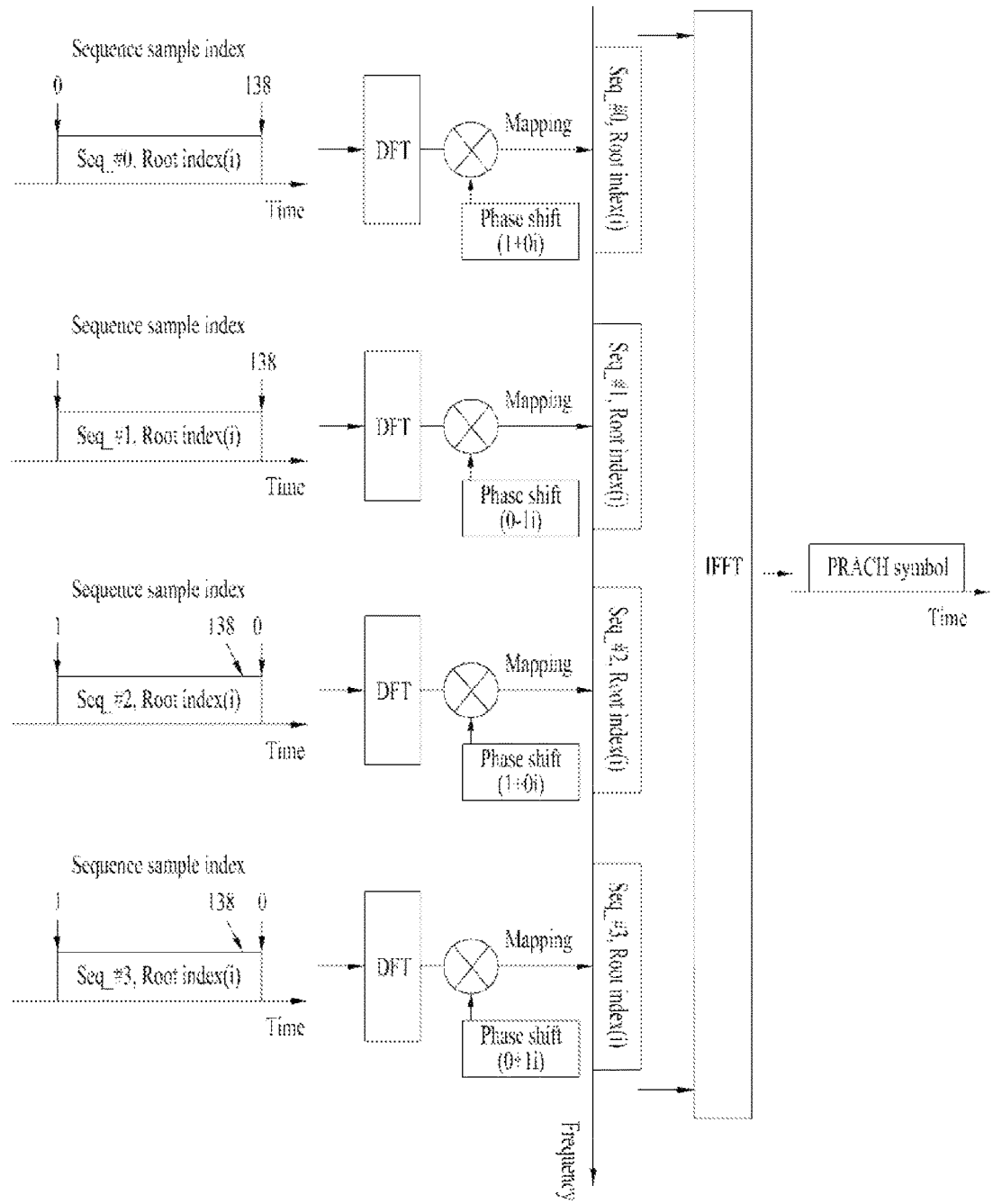

[Fig. 18]
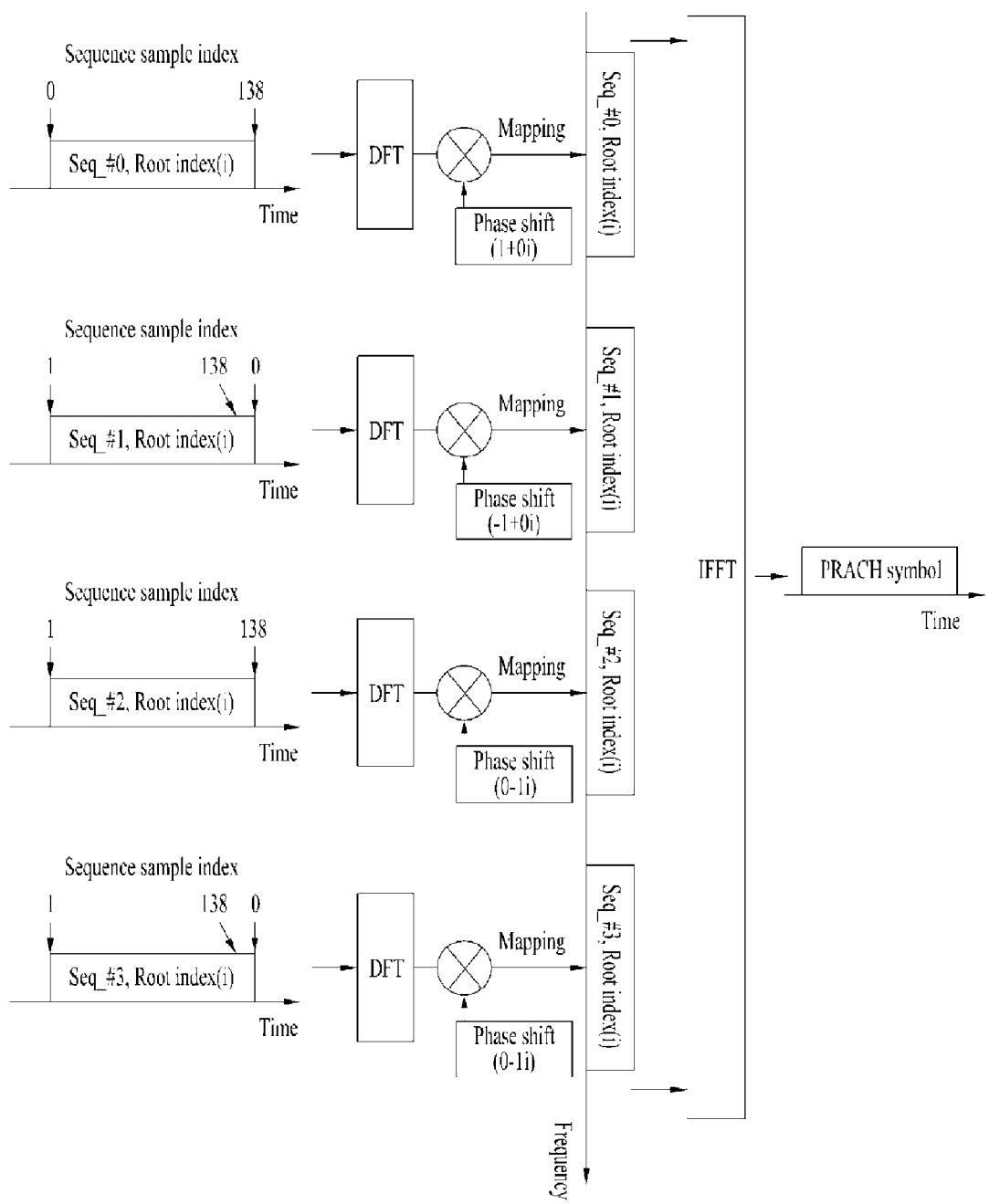

[Fig. 19]

| PS Index | ps R1 | ps R2 | ps R3 | ps R4 | ps R5 | ps R6 | ps R7 | ps R8 | CS Index | cs R1 | cs R2 | cs R3 | cs R4 | cs R5 | cs R6 | cs R7 | cs R8 | PAPR | CM |
|---|---|---|---|---|---|---|---|---|---|---|---|---|---|---|---|---|---|---|---|
| 5781 | 1 | 0+1i | 0+1i | -1 | -1 | 0+1i | 0+1i | -1 | 86 | 0 | 1 | 0 | 1 | 0 | 1 | 0 | 1 | 3.518929 | 1.899 |
| 5781 | 1 | 0+1i | 0+1i | -1 | -1 | 0+1i | 0+1i | -1 | 52 | 0 | 0 | 1 | 1 | 0 | 1 | 1 | 1 | 3.52279 | 1.958 |
| 5674 | 1 | 0+1i | 0+1i | -1 | -1 | -1 | -1 | -1 | 98 | 0 | 1 | 1 | 1 | 1 | 0 | 0 | 1 | 3.655816 | 2.05 |
| 15810 | 1 | 0+1i | 1 | 0+1i | 0+1i | 1 | -1 | 0+1i | 122 | 0 | 1 | 1 | 0 | 1 | 0 | 0 | 1 | 3.655816 | 2.054 |
| 9079 | 1 | -1 | 0+1i | -1 | 0+1i | 0+1i | -1 | -1 | 122 | 0 | 1 | 1 | 0 | 1 | 0 | 0 | 1 | 3.655816 | 2.055 |
| 1241 | 1 | 1 | 0+1i | 1 | 0+1i | 1 | 1 | 1 | 98 | 0 | 1 | 1 | 1 | 1 | 0 | 0 | 1 | 3.657687 | 2.055 |
| 15916 | 1 | 0+1i | 0-1i | 0+1i | 0+1i | 0+1i | -1 | 0-1i | 122 | 0 | 1 | 1 | 0 | 1 | 0 | 0 | 1 | 3.657687 | 2.055 |
| 8164 | 1 | 0+1i | 0-1i | 0+1i | -1 | 1 | -1 | 0-1i | 98 | 0 | 1 | 1 | 1 | 1 | 0 | 0 | 1 | 3.657687 | 2.056 |
| 3859 | 1 | 1 | 0-1i | 0+1i | 1 | 0+1i | 1 | -1 | 98 | 0 | 1 | 1 | 0 | 1 | 0 | 0 | 1 | 3.655816 | 2.057 |
| 11569 | 1 | 0+1i | 0-1i | 0+1i | -1 | 0+1i | 1 | -1 | 98 | 0 | 1 | 1 | 1 | 1 | 0 | 0 | 1 | 3.657687 | 2.057 |
| 13324 | 1 | 0+1i | 0+1i | 0+1i | 1 | -1 | 1 | 0+1i | 98 | 0 | 1 | 1 | 0 | 0 | 0 | 0 | 1 | 3.657687 | 2.057 |
| 13666 | 1 | 0+1i | 0-1i | 0+1i | 1 | -1 | -1 | -1 | 122 | 0 | 1 | 1 | 1 | 1 | 0 | 0 | 1 | 3.655816 | 2.058 |
| 7178 | 1 | 0+1i | 0-1i | 1 | 1 | 1 | 1 | 1 | 98 | 0 | 1 | 1 | 1 | 0 | 0 | 0 | 1 | 3.657687 | 2.06 |
| 1331 | 1 | 1 | 0-1i | 0+1i | 0+1i | 0+1i | -1 | 0-1i | 98 | 0 | 1 | 1 | 0 | 1 | 0 | 0 | 1 | 3.655816 | 2.06 |
| 10301 | 1 | -1 | 0+1i | 0+1i | 1 | 0-1i | 1 | 1 | 98 | 0 | 1 | 1 | 1 | 0 | 0 | 0 | 1 | 3.655816 | 2.06 |
| 11867 | 1 | -1 | 0+1i | -1 | 0+1i | 0+1i | -1 | -1 | 122 | 0 | 1 | 1 | 1 | 1 | 0 | 0 | 1 | 3.655816 | 2.061 |
| 3193 | 1 | 1 | 0-1i | 1 | 0+1i | 1 | 1 | 1 | 122 | 0 | 1 | 1 | 1 | 1 | 0 | 0 | 1 | 3.655816 | 2.061 |
| 5956 | 1 | 0+1i | 0-1i | 0+1i | 0+1i | 0+1i | 0-1i | 0-1i | 122 | 0 | 0 | 1 | 1 | 1 | 0 | 0 | 1 | 3.657687 | 2.065 |
| 7178 | 1 | 0+1i | 0-1i | 1 | 1 | 1 | -1 | 0-1i | 52 | 0 | 0 | 0 | 1 | 1 | 1 | 1 | 1 | 3.915526 | 2.245 |
| 5956 | 1 | 0+1i | 0+1i | 0-1i | 0+1i | 1 | 1 | 0-1i | 8 | 0 | 0 | 0 | 1 | 0 | 1 | 1 | 1 | 3.913762 | 2.249 |

[Fig. 20]
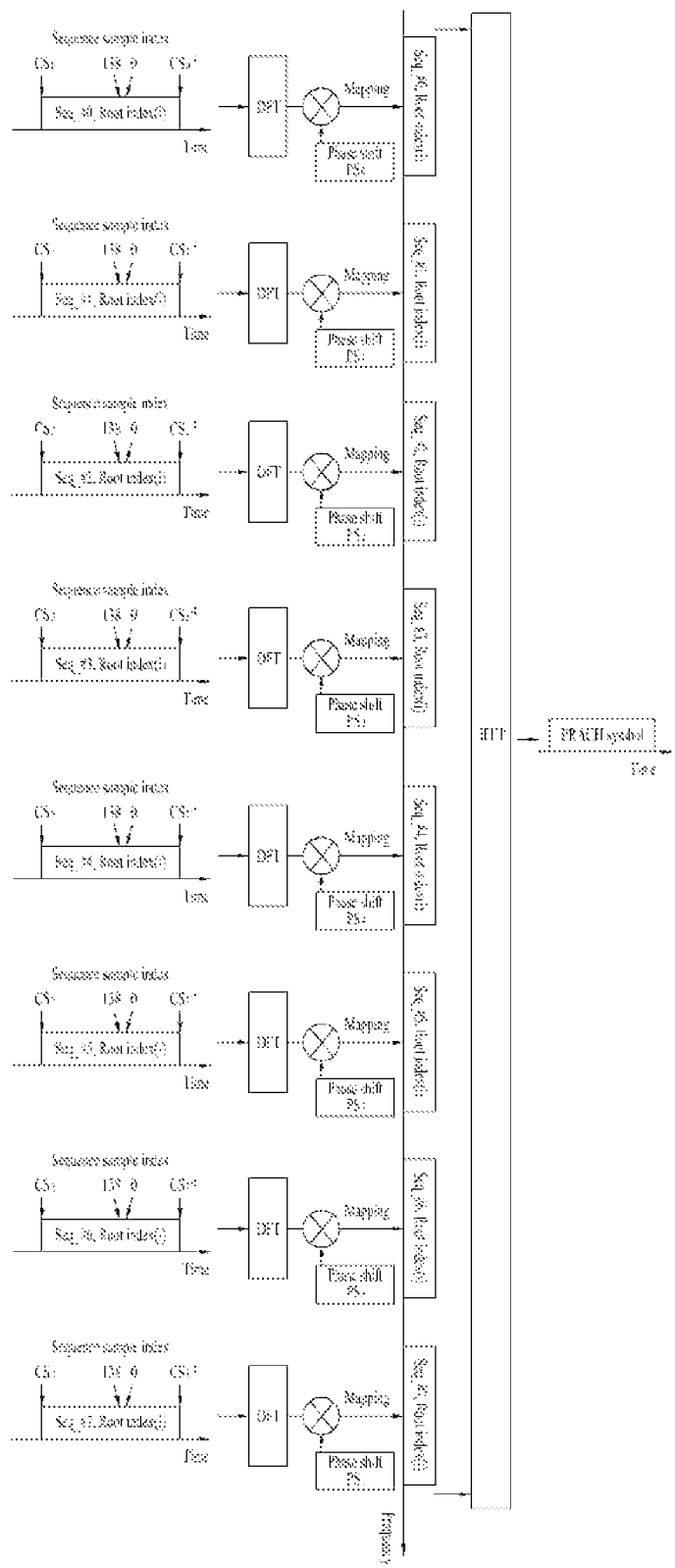

[Fig. 21]
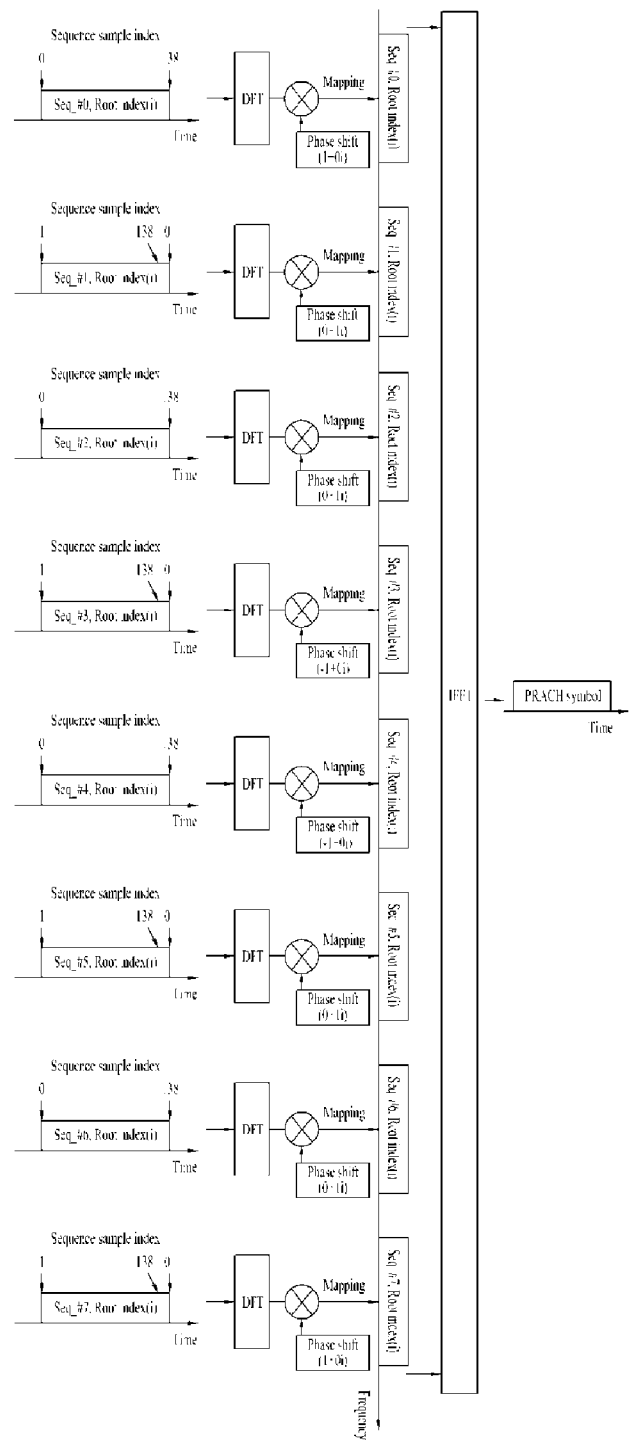

[Fig. 22]
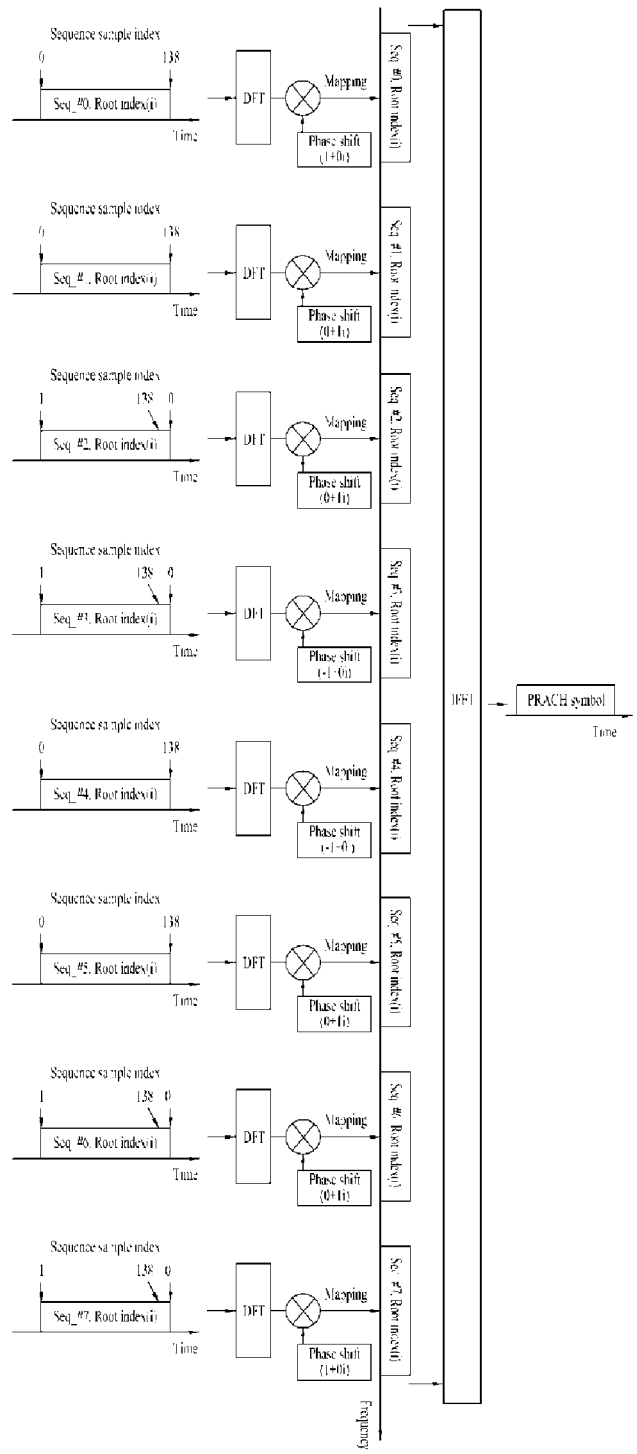

[Fig. 23]
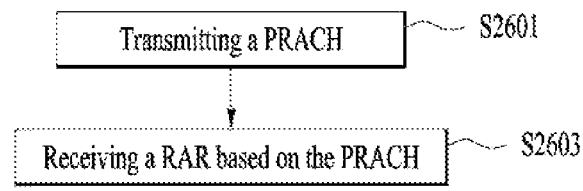

[Fig. 24]
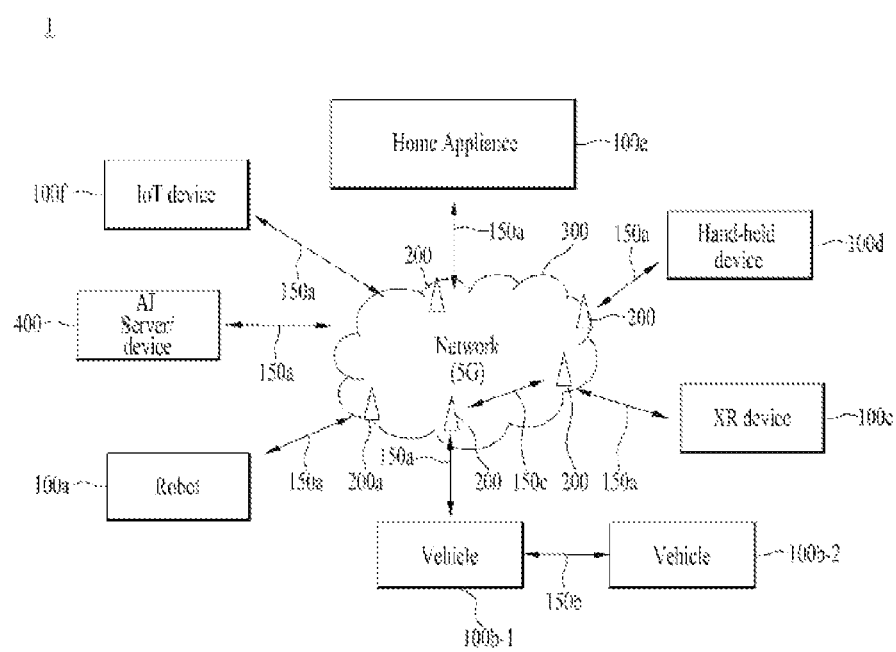

[Fig. 25]
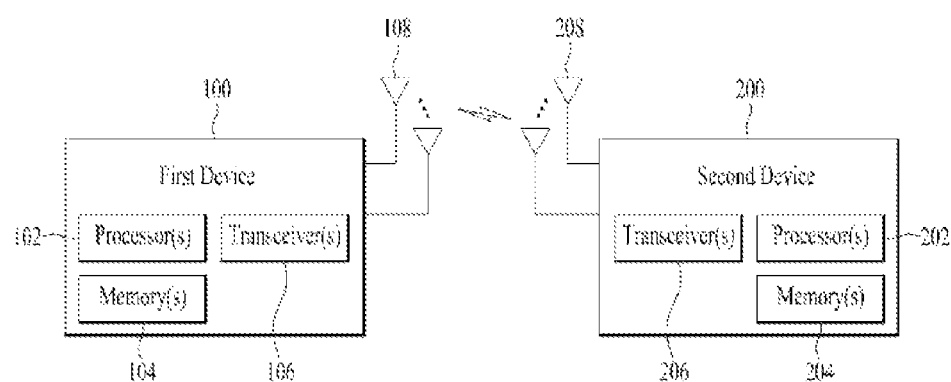
[Fig. 26]
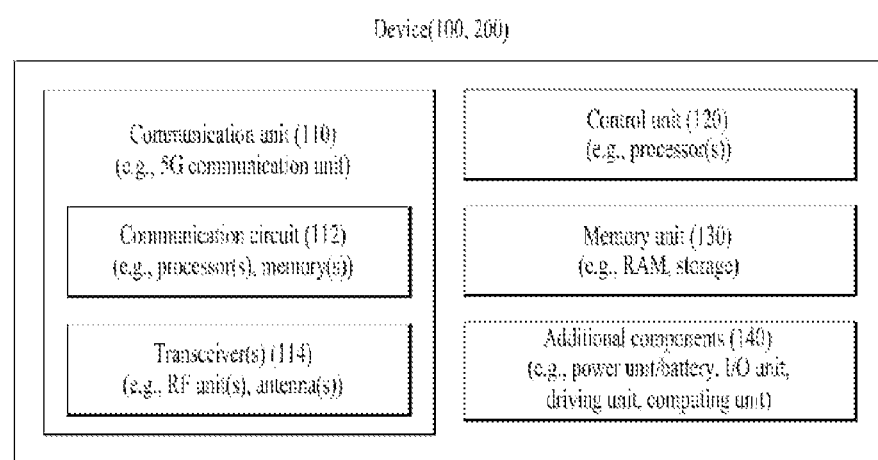

[Fig. 27]
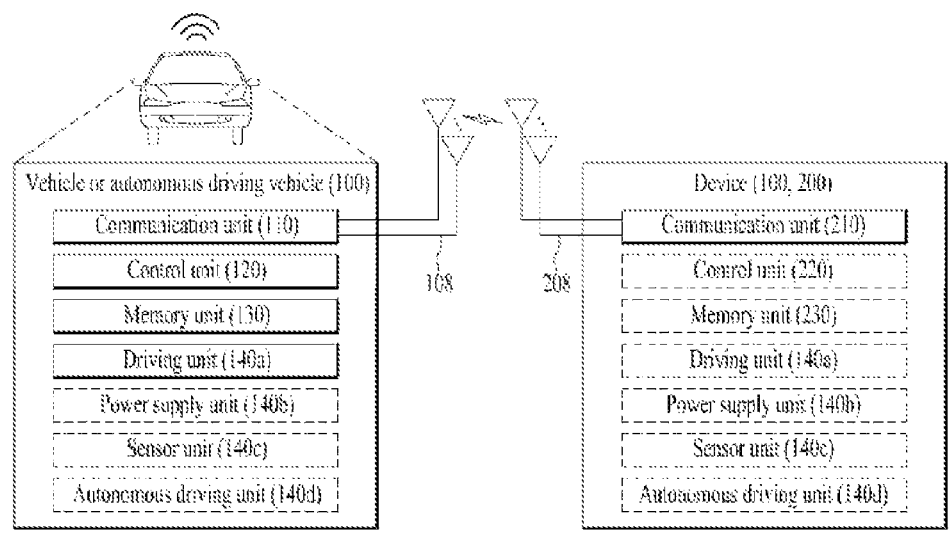

METHOD AND DEVICE FOR TRANSMITTING AND RECEIVING SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2020/004228, filed on Mar. 27, 2020, which claims the benefit of earlier filing date and right of priority to Korean Application Nos. 10-2019-0036390, filed on Mar. 28, 2019, and 10-2019-0084801, filed on Jul. 12, 2019, the contents of which are all incorporated by reference herein in their entireties.

TECHNICAL FIELD

The present disclosure relates to a method and device for use in a wireless communication system, and more particularly to a random access method and device for use in a wireless communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of code division multiple access (CDMA) system, frequency division multiple access (FDMA) system, time division multiple access (TDMA) system, orthogonal frequency division multiple access (OFDMA) system, single carrier frequency division multiple access (SC-FDMA) system, and the like.

DISClOSURE

Technical Problem

Provided are a method and apparatus for performing a random access procedure efficiently in a wireless communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

The present disclosure provides a method and apparatus for transmitting and receiving a signal in a wireless communication system.

In accordance with an aspect of the present disclosure, a method for enabling a user equipment (UE) to transmit and receive signals in a wireless communication system may include transmitting a physical random access channel (PRACH), and receiving a random access response (RAR) based on the PRACH. The PRACH may include N_MAX sequences mapped to a frequency domain. The N_MAX sequences may construct M groups each including N sequences, and the N_MAX sequences may have the same length. The N_MAX sequences may be generated based on the same base sequence, different cyclic shift (CS) values may be applied to the N sequences, and the pattern of the different CS values may be equally applied to the M groups.

In accordance with another aspect of the present disclosure, a communication device (i.e., user equipment (UE)) configured to transmit and receive signals in a wireless communication system may include at least one transceiver, at least one processor, and at least one memory operatively connected to the at least one processor, and configured to store instructions such that the at least one processor performs specific operations by executing the instructions. The specific operations may include transmitting a physical random access channel (PRACH), and receiving a random access response (RAR) based on the PRACH. The PRACH may include N_MAX sequences mapped to a frequency domain. The N_MAX sequences may construct M groups each including N sequences, and the N_MAX sequences may have the same length. The N_MAX sequences may be generated based on the same base sequence, different cyclic shift (CS) values may be applied to the N sequences, and the pattern of the different CS values may be equally applied to the M groups.

In accordance with another aspect of the present disclosure, a method for enabling a base station (BS) to transmit and receive signals in a wireless communication system may include receiving a physical random access channel (PRACH), and transmitting a random access response (RAR) based on the PRACH. The PRACH may include N_MAX sequences mapped to a frequency domain. The N_MAX sequences may construct M groups each including N sequences, and the N_MAX sequences may have the same length. The N_MAX sequences may be generated based on the same base sequence, different cyclic shift (CS) values may be applied to the N sequences, and the pattern of the different CS values may be equally applied to the M groups.

In accordance with another aspect of the present disclosure, a communication device (base station (BS)) configured to transmit and receive signals in a wireless communication system may include at least one transceiver, at least one processor, and at least one memory operatively connected to the at least one processor, and configured to store instructions such that the at least one processor performs specific operations by executing the instructions. The specific operations may include receiving a physical random access channel (PRACH), and transmitting a random access response (RAR) based on the PRACH. The PRACH may include N_MAX sequences mapped to a frequency domain. The N_MAX sequences may construct M groups each including N sequences, and the N_MAX sequences may have the same length. The N_MAX sequences may be generated based on the same base sequence, different cyclic shift (CS) values may be applied to the N sequences, and the pattern of the different CS values may be equally applied to the M groups.

In accordance with another aspect of the present disclosure, a device configured to operate for a user equipment (UE) may include at least one processor, and at least one memory operatively connected to the at least one processor, and configured to store instructions such that the at least one processor performs specific operations by executing the instructions. The specific operations may include transmitting a physical random access channel (PRACH), and receiving a random access response (RAR) based on the PRACH. The PRACH may include N_MAX sequences mapped to a frequency domain. The N_MAX sequences may construct M groups each including N sequences, and the N_MAX sequences may have the same length. The N_MAX sequences may be generated based on the same base sequence, different cyclic shift (CS) values may be applied to the N sequences, and the pattern of the different CS values may be equally applied to the M groups.

In accordance with another aspect of the present disclosure, a computer-readable storage medium may store instructions which when executed by at least one processor, cause the processor to perform specific operations. The specific operations may include transmitting a physical random access channel (PRACH), and receiving a random access response (RAR) based on the PRACH. The PRACH may include N_MAX sequences mapped to a frequency domain. The N_MAX sequences may construct M groups each including N sequences, and the N_MAX sequences may have the same length. The N_MAX sequences may be generated based on the same base sequence, different cyclic shift (CS) values may be applied to the N sequences, and the pattern of the different CS values may be equally applied to the M groups.

In the methods and devices, a phase shift (PS) value may be separately applied to each of the N_MAX sequences.

In the methods and devices, the cyclic shift (CS) value and the phase shift (PS) value may be determined based on the length, the N_MAX value, and a Peak to Average Power Ratio (PAPR) and/or Cube Metric (CM) value.

In the methods and devices, the N_MAX value may be set to 4. From among the N_MAX sequences, the CS value of '0' and the PS value of '0' may be applied to a first sequence, the CS value corresponding to 1 sample and the PS value of '0+1i' may be applied to a second sequence, the CS value of '0' and the PS value of '0+1i' may be applied to a third sequence, and the CS value corresponding to 1 sample and the PS value of '0' may be applied to a fourth sequence. From among the N_MAX sequences, the CS value of '0' and the PS value of '0' may be applied to the first sequence, the CS value of '0' and the PS value of '0−1i' may be applied to the second sequence, the CS value corresponding to 1 sample and the PS value of '0' may be applied to the third sequence, and the CS value corresponding to 1 sample and the PS value of '0+1i' may be applied to the fourth sequence. From among the N_MAX sequences, the CS value of '0' and the PS value of '0' may be applied to the first sequence, the CS value corresponding to 1 sample and the PS value of '−1' may be applied to the second sequence, the CS value of '0' and the PS value of '0−1i' may be applied to the third sequence, and the CS value corresponding to 1 sample and the PS value of '0−1i' may be applied to the fourth sequence.

In the methods and devices, the N_MAX value may be set to 8. From among the N_MAX sequences, the CS value of '0' and the PS value of '0' may be applied to a first sequence, the CS value corresponding to 1 sample and the PS value of '0+1i' may be applied to a second sequence, the CS value of '0' and the PS value of '0+1i' may be applied to a third sequence, the CS value corresponding to 1 sample and the PS value of '−1' may be applied to a fourth sequence, the CS value of '0' and the PS value of '−1' may be applied to a fifth sequence, the CS value corresponding to 1 sample and the PS value of '0+1i' may be applied to a sixth sequence, the CS value of '0' and the PS value of '0+1i' may be applied to a seventh sequence, and the CS value corresponding to 1 sample and the PS value of '0' may be applied to an eighth sequence. From among the N_MAX sequences, the CS value of '0' and the PS value of '0' may be applied to the first sequence, the CS value of '0' and the PS value of '0+1i' may be applied to the second sequence, the CS value corresponding to 1 sample and the PS value of '0+1i' may be applied to the third sequence, the CS value corresponding to 1 sample and the PS value of '−1' may be applied to the fourth sequence, the CS value of '0' and the PS value of '−1' may be applied to the fifth sequence, the CS value of '0' and the PS value of '0+1i' may be applied to the sixth sequence, the CS value corresponding to 1 sample and the PS value of '0+1i' may be applied to the seventh sequence, and the CS value corresponding to 1 sample and the PS value of '0' may be applied to the eighth sequence.

In the method or the device, the communication device may include an autonomous driving vehicle communicable with at least a user equipment (UE), a network, and another autonomous driving vehicle other than the communication device.

The above-described aspects of the present disclosure are only some of the preferred embodiments of the present disclosure, and various embodiments reflecting the technical features of the present disclosure may be derived and understood from the following detailed description of the present disclosure by those skilled in the art.

Advantageous Effects

According to an embodiment of the present disclosure, a communication device may perform a random access procedure more efficiently by an operation differentiated from a legacy operation.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

FIG. 1 illustrates a radio frame structure.

FIG. 2 illustrates a resource grid during the duration of a slot.

FIG. 3 illustrates a self-contained slot structure.

FIG. 4 illustrates a wireless communication system supporting an unlicensed band.

FIG. 5 illustrates a method of occupying resources in an unlicensed band.

FIGS. 6 and 7 are flowcharts illustrating channel access procedures (CAPs) for signal transmission in an unlicensed band.

FIGS. 8 and 9 are diagrams illustrating a signal flow for a random access procedure.

FIGS. 10 to 23 illustrate random access procedures according to an embodiment of the present disclosure.

FIGS. 24 to 27 illustrate devices according to an embodiment of the present disclosure.

BEST MODE

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

For clarity of description, the present disclosure will be described in the context of a 3GPP communication system (e.g., LTE and NR), which should not be construed as limiting the spirit of the present disclosure. LTE refers to a technology beyond 3GPP TS 36.xxx Release 8. Specifically, the LTE technology beyond 3GPP TS 36.xxx Release 10 is called LTE-A, and the LTE technology beyond 3GPP TS 36.xxx Release 13 is called LTE-A pro. 3GPP NR is the technology beyond 3GPP TS 38.xxx Release 15. LTE/NR may be referred to as a 3GPP system. "xxx" specifies a technical specification number. LTE/NR may be generically referred to as a 3GPP system. For the background technology, terminologies, abbreviations, and so on as used herein, refer to technical specifications published before the present disclosure. For example, the following documents may be referred to.

3GPP LTE
  36.211: Physical channels and modulation
  36.212: Multiplexing and channel coding
  36.213: Physical layer procedures
  36.300: Overall description
  36.331: Radio Resource Control (RRC)
3GPP NR
  38.211: Physical channels and modulation
  38.212: Multiplexing and channel coding
  38.213: Physical layer procedures for control
  38.214: Physical layer procedures for data
  38.300: NR and NG-RAN Overall Description
  38.331: Radio Resource Control (RRC) protocol specification FIG. 1 illustrates a radio frame structure used for NR.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS (15 * 2^u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: number of symbols in a slot
* $N^{frame,u}_{slot}$: number of slots in a frame
* $N^{subframe,u}_{slot}$: number of slots in a subframe Table 2 illustrates that the number of symbols per slot, the number of slots per frame, and the number of slots per subframe vary according to SCSs in an extended CP case.

TABLE 2

| SCS (15 * 2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells.

FIG. 2 illustrates a resource grid during the duration of one slot.

A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

FIG. 3 illustrates a structure of a self-contained slot.

In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
  2. UL only configuration
  3. Mixed UL-DL configuration
    DL region+Guard period (GP)+UL control region
    DL control region+GP+UL region
    * DL region: (i) DL data region, (ii) DL control region+
      DL data region

* UL region: (i) UL data region, (ii) UL data region+UL control region

The PDCCH may be transmitted in the DL control region, and the PDSCH may be transmitted in the DL data region. The PUCCH may be transmitted in the UL control region, and the PUSCH may be transmitted in the UL data region. The GP provides a time gap in the process of the UE switching from the transmission mode to the reception mode or from the reception mode to the transmission mode. Some symbols at the time of switching from DL to UL within a subframe may be configured as the GP.

In the present disclosure, a base station (BS) may be, for example, a gNode B (gNB).

1. Wireless Communication System Supporting Unlicensed Band

FIG. 4 illustrates an exemplary wireless communication system supporting an unlicensed band applicable to the present disclosure.

In the following description, a cell operating in a licensed band (L-band) is defined as an L-cell, and a carrier of the L-cell is defined as a (DL/UL) LCC. A cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is commonly called a cell.

When a UE and a BS transmit and receive signals in a carrier-aggregated LCC and UCC as illustrated in FIG. 4(a), the LCC may be configured as a primary CC (PCC) and the UCC may be configured as a secondary CC (SCC). As illustrated in FIG. 4(b), the UE and the BS may transmit and receive signals in one UCC or a plurality of carrier-aggregated UCCs. That is, the UE and the BS may transmit and receive signals only in UCC(s) without an LCC.

(Unless otherwise specified), a signal transmission/reception operation in an unlicensed band described in the present disclosure may be performed based on all the above-described deployment scenarios.

Radio Frame Structure for Unlicensed Band

Recently, the 3GPP standardization group has proceeded to standardize a 5G system named New RAT (NR). The NR system has been designed to provide a plurality of logical networks in a single physical system and support services with various requirements (e.g., eMBB, mMTC, URLLC, etc.) by changing a transmission time interval (TTI) and/or an OFDM numerology (e.g., OFDM symbol duration, subcarrier spacing (SCS), and so on). In recent years, data traffic has significantly increased with the advent of smart devices. Thus, the 3GPP NR system has also considered the use of an unlicensed band for cellular communication as in LAA of the legacy 3GPP LTE system. However, unlike the LAA, a NR cell in the unlicensed-band (NR U-cell) aims to support standalone operation. For example, PUCCH, PUSCH, and PRACH transmissions at the UE may be supported.

The NR frame structure of FIG. 1 may be used for an operation in an unlicensed band. The configuration of OFDM symbols occupied for UL/DL signal transmission in the frame structure for the unlicensed band may be configured by the BS. The term OFDM symbol may be replaced with SC-FDM(A) symbol.

In the following description, a plurality of CCs (CC indexes) may be replaced with a plurality of BWPs (BWP indexes) configured in one (or more) CC(s) or (serving) cell(s), or a plurality of CCs/cells each including a plurality of BWPs (i.e., CC (index)-BWP (index) combinations). In this situation, the proposed principle/operations of the present disclosure are also applicable in the same manner.

FIG. 5 illustrates an exemplary method of occupying resources in an unlicensed band. According to regional regulations for the U-band, a communication node in the U-band needs to determine whether a corresponding channel is used by other communication node(s) before transmitting a signal. Specifically, the communication node may perform carrier sensing (CS) before transmitting the signal so as to check whether the other communication node(s) perform signal transmission. When the other communication node(s) perform no signal transmission, it is said that clear channel assessment (CCA) is confirmed. When a CCA threshold is predefined or configured by higher layer signaling (e.g., RRC signaling), if the detected channel energy is higher than the CCA threshold, the communication node may determine that the channel is busy. Otherwise, the communication node may determine that the channel is idle. When it is determined that the channel is idle, the communication node may start the signal transmission in the UCell. The Wi-Fi standard (802.11ac) specifies a CCA threshold of 62 dBm for non-Wi-Fi signals and a CCA threshold of −82 dBm for Wi-Fi signals. The sires of processes described above may be referred to as Listen-Before-Talk (LBT) or a channel access procedure (CAP). The LBT may be interchangeably used with the CAP or CCA.

Specifically, for DL reception/UL transmission in an unlicensed band, one or more of the following channel access procedure (CAP) methods may be used in a wireless communication system related to the present disclosure.

Method of Transmitting DL Signal in Unlicensed Band

To transmit a DL signal in an unlicensed band, the BS may indicate the configuration of OFDM symbols used in subframe #n to the UE by signaling. The term subframe may be replaced with slot or time unit (TU).

The BS may perform one of the following unlicensed band access procedures (e.g., CAPs) to transmit a DL signal in the unlicensed band.

(1) First DL CAP method

FIG. 6 is a flowchart illustrating a DL CAP for DL signal transmission in an unlicensed band, performed by a BS.

For DL signal transmission (e.g., transmission of a DL signal such as a PDSCH/PDCCH/enhanced PDCCH (EPDCCH)), the BS may initiate a CAP (S1210). The BS may randomly select a backoff counter N within a contention window (CW) according to step 1. N is set to an initial value Ninit (S1220). Ninit is a random value selected from the values between 0 and $CW_p$. Subsequently, when the backoff counter value N is 0 according to step 4 (S1230; Y), the BS terminates the CAP (S1232). The BS may then perform a Tx burst transmission including transmission of a PDSCH/PDCCH/EPDCCH (S1234). On the contrary, when the backoff counter value N is not 0 (S1230; N), the BS decrements the backoff counter value by 1 according to step 2 (S1240). Subsequently, the BS checks whether the channel of U-cell(s) is idle (S1250). If the channel is idle (S1250; Y), the BS determines whether the backoff counter value is 0 (S1230). On the contrary, when the channel is not idle, that is, the channel is busy (S1250; N), the BS determines whether the channel is idle during a longer defer duration Td (25 usec or longer) than a slot duration (e.g., 9 usec) according to step 5 (S1260). If the channel is idle during the defer duration (S1270; Y), the BS may resume the CAP. The defer duration may include a 16-usec duration and the immediately following mp consecutive slot durations (e.g., each being 9 usec). On the contrary, if the channel is busy during the defer duration (S1270; N), the BS re-checks whether the channel of the U-cell(s) is idle during a new defer duration by performing step S1260 again.

Table 4 illustrates that mp, a minimum CW, a maximum CW, a maximum channel occupancy time (MCOT), and an allowed CW size applied to a CAP vary according to channel access priority classes.

TABLE 4

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

A CW size applied to the first DL CAP may be determined in various methods. For example, the CW size may be adjusted based on the probability of HARQ-ACK values corresponding to PDSCH transmission(s) within a predetermined time period (e.g., a reference TU) being determined as NACK. In the case where the BS performs a DL transmission including a PDSCH that is associated with a channel access priority class p on a carrier, if the probability z of HARQ-ACK values corresponding to PDSCH transmission(s) in reference subframe k (or reference slot k) being determined as NACK is at least 80%, the BS increases a CW value set for each priority class to the next higher allowed value. Alternatively, the BS maintains the CW value set for each priority class to be an initial value. A reference subframe (or reference slot) may be defined as the starting subframe (or slot) of the most recent transmission on the carrier made by the BS, for which at least some HARQ-ACK feedback is expected to be available.

(2) Second DL CAP method

The BS may perform a DL signal transmission (e.g., a signal transmission including a discovery signal transmission, without a PDSCH) in an unlicensed band according to the second DL CAP method described below.

When the signal transmission duration of the BS is equal to or less than 1 ms, the BS may transmit a DL signal (e.g., a signal including a discovery signal without a PDSCH) in the unlicensed band immediately after sensing the channel to be idle for at least a sensing duration $T_{drs}$=25 us. $T_{drs}$ includes a duration $T_f$ (=16 us) following one sensing slot duration $T_{sl}$ (=9 us).

(3) Third DL CAP method

The BS may perform the following CAPs for DL signal transmission on multiple carriers in an unlicensed band.

1) Type A: The BS performs a CAP for multiple carriers based on a counter N defined for each carrier (a counter N considered in a CAP) and performs a DL signal transmission based on the CAP.

Type A1: The counter N for each carrier is determined independently, and a DL signal is transmitted on each carrier based on the counter N for the carrier.

Type A2: The counter N of a carrier with a largest CW size is set for each carrier, and a DL signal is transmitted on each carrier based on the counter N for the carrier.

2) Type B: The BS performs a CAP based on a counter N only for a specific one of a plurality of carriers and performs a DL signal transmission by checking whether the channels of the other carriers are idle before a signal transmission on the specific carrier.

Type B1: A single CW size is defined for a plurality of carriers, and the BS uses the single CW size in a CAP based on the counter N for a specific carrier.

Type B2: A CW size is defined for each carrier, and the largest of the CW sizes is used in determining $N_{init}$ for a specific carrier.

Method of Transmitting UL Signal in Unlicensed Band

For a UL signal transmission in an unlicensed band, the BS may transmit information about a UL transmission period to the UE by signaling.

For a UL signal transmission in the unlicensed band, the UE performs a contention-based CAP. For example, the UE may perform a Type 1 CAP or a Type 2 CAP for UL signal transmission in the U-band. In general, the UE may perform a CAP configured/indicated by the BS (e.g., Type 1 CAP or Type 2 CAP) for the UL signal transmission.

(1) Type 1 UL CAP method

FIG. 7 is a flowchart illustrating UE's Type 1 CAP operation for UL signal transmission.

To transmit a signal in the U-band, the UE may initiate a CAP (S1510). The UE may randomly select a backoff counter N within a contention window (CW) according to step 1. In this case, N is set to an initial value $N_{init}$ (S1520). $N_{init}$ may have a random value between 0 and $CW_p$. If it is determined according to step 4 that the backoff counter value (N) is 0 (YES in S1530), the UE terminates the CAP (S1532). Then, the UE may perform Tx burst transmission (S1534). If the backoff counter value is non-zero (NO in S1530), the UE decreases the backoff counter value by 1 according to step 2 (S1540). The UE checks whether the channel of U-cell(s) is idle (S1550). If the channel is idle (YES in S1550), the UE checks whether the backoff counter value is 0 (S1530). On the contrary, if the channel is not idle in S1550, that is, if the channel is busy (NO in S1550), the UE checks whether the corresponding channel is idle for a defer duration Td (longer than or equal to 25 usec), which is longer than a slot duration (e.g., 9 usec), according to step 5 (S1560). If the channel is idle for the defer duration (YES in S1570), the UE may resume the CAP. Here, the defer duration may include a duration of 16 usec and mp consecutive slot durations (e.g., 9 usec), which immediately follows the duration of 16 usec. If the channel is busy for the defer duration (NO in S1570), the UE performs step S1560 again to check whether the channel is idle for a new defer duration.

Table 5 shows that the values of $m_p$, a minimum CW, a maximum CW, a maximum channel occupancy time (MCOT), and allowed CW sizes, which are applied to the CAP, vary depending on channel access priority classes.

TABLE 5

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

The size of a CW applied to the Type 1 UL CAP may be determined in various ways. For example, the CW size may be adjusted depending on whether the value of of a new data indicator (NDI) for at least one HARQ process associated with HARQ_ID_ref, which is the HARQ process ID of a UL-SCH in a predetermined time period (e.g., a reference TU), is toggled. When the UE performs signal transmission using the Type 1 CAP associated with the channel access priority class p on a carrier, if the value of the NDI for the at least one HARQ process associated with HARQ_ID_ref is toggled, the UE may set $CW_p$ to CWmin,p for every priority class $p \in \{1, 2, 3, 4\}$. Otherwise, the UE may increase $CW_p$ for every priority class $p \in \{1, 2, 3, 4\}$ to a next higher allowed value.

A reference subframe (or slot) $n_{ref}$ is determined as follows.

When the UE receives a UL grant in a subframe (or slot) $n_g$ and transmits a UL-SCH in subframes (or slots) $n_0$, $n_1, \ldots n_W$, starting from the subframe (or slot) $n_0$ without a gap (the subframe (or slot) $n_W$ is the most recent subframe (or slot) before a subframe (or slot) $n_g$-3 in which the UE has transmitted a UL-SCH based on a Type 1 CAP), the reference subframe (or slot) $n_{ref}$ is the subframe (or slot) $n_0$.

(2) Type 2 UL CAP Method

When the UE uses the Type 2 CAP to transmit a UL signal (including the PUSCH) in a U-band, the UE may transmit the UL signal (including the PUSCH) in the U-band immediately after sensing that the channel is idle at least for a sensing period $T_{short\_ul}$ of 25 us. $T_{short\_ul}$ includes a duration $T_f$ of 16 us immediately followed by one slot duration $T_{sl}$ of 9 us. $T_f$ includes an idle slot duration $T_{sl}$ at the start thereof.

2. Random Access Procedure

FIG. 8 illustrates random access procedures. FIG. 8(a) illustrates the contention-based random access procedure, and FIG. 8(b) illustrates the dedicated random access procedure.

Referring to FIG. 8(a), the contention-based random access procedure includes the following four steps. The messages transmitted in steps 1 to 4 may be referred to as message 1 (Msg1) to message 4 (Msg4), respectively.

Step 1: The UE transmits an RACH preamble on a PRACH.

Step 2: The UE receives a random access response (RAR) on a DL-SCH from the BS.

Step 3: The UE transmits a Layer 2 (L2)/Layer 3 (L3) message on a UL-SCH to the BS.

Step 4: The UE receives a contention resolution message on the DL-SCH from the BS.

The UE may receive random access information in system information from the BS.

When the UE needs random access, the UE transmits an RACH preamble to the BS as in step 1. The BS may identify each RACH preamble by a time/frequency resource (RACH occasion (RO)) in which the RACH preamble is transmitted, and a preamble index (PI).

Upon receipt of the RACH preamble from the UE, the BS transmits an RAR message to the UE as in step 2. To receive the RAR message, the UE monitors an L1/L2 PDCCH with a cyclic redundancy check (CRC) masked with a random access-RNTI (RA-RNTI), including scheduling information for the RAR message, within a preconfigured time window (e.g., ra-ResponseWindow). The PDCCH masked with the RA-RNTI may be transmitted only in a common search space. When receiving a scheduling signal masked with the RA-RNTI, the UE may receive an RAR message on a PDSCH indicated by the scheduling information. The UE then checks whether there is RAR information directed to the UE in the RAR message. The presence or absence of the RAR information directed to the UE may be determined by checking whether there is a random access preamble ID (RAPID) for the preamble transmitted by the UE. The index of the preamble transmitted by the UE may be identical to the RAPID. The RAR information includes the index of the corresponding RACH preamble, timing offset information (e.g., timing advance command (TAC)) for UL synchronization, UL scheduling information (e.g., UL grant) for Msg3 transmission, and UE temporary identification information (e.g., temporary-C-RNTI (TC-RNTI)).

Upon receipt of the RAR information, the UE transmits UL-SCH data (Msg3) on a PUSCH according to the UL scheduling information and the timing offset value, as in step 3. Msg3 may include the ID (or global ID) of the UE. Alternatively, Msg3 may include RRC connection request-related information (e.g., RRCSetupRequest message) for initial access. In addition, Msg3 may include a buffer status report (BSR) on the amount of data available for transmission at the UE.

After receiving the UL-SCH data, the BS transmits a contention resolution message (Msg4) to the UE as in step 4. When the UE receives the contention resolution message and succeeds in contention resolution, the TC-RNTI is changed to a C-RNTI. Msg4 may include the ID of the UE and/or RRC connection-related information (e.g., an RRC-Setup message). When information transmitted in Msg3 does not match information received in Msg4, or when the UE has not received Msg4 for a predetermined time, the UE may retransmit Msg3, determining that the contention resolution has failed.

Referring to FIG. 8(b), the dedicated random access procedure includes the following three steps. Messages transmitted in steps 0 to 2 may be referred to as Msg0 to Msg2, respectively. The BS may trigger the dedicated random access procedure by a PDCCH serving the purpose of commanding RACH preamble transmission (hereinafter, referred to as a PDCCH order).

Step 0: The BS allocates an RACH preamble to the UE by dedicated signaling.

Step 1: The UE transmits the RACH preamble on a PRACH.

Step 2: The UE receives an RAR on a DL-SCH from the BS.

Steps 1 and 2 of the dedicated random access procedure may be the same as steps 1 and 2 of the contention-based random access procedure.

In NR, DCI format 1_0 is used to initiate a non-contention-based random access procedure by a PDCCH order. DCI format 1_0 is used to schedule a PDSCH in one DL cell. When the CRC of DCI format 1_0 is scrambled with a C-RNTI, and all bits of a "Frequency domain resource assignment" field are 1 s, DCI format 1_0 is used as a PDCCH order indicating a random access procedure. In this case, the fields of DCI format 1_0 are configured as follows.

RA preamble index: 6 bits

UL/supplementary UL (SUL) indicator: 1 bit. When the bits of the RA preamble index are all non-zeroes and SUL is configured for the UE in the cell, the UL/SUL indicator indicates a UL carrier in which a PRACH is transmitted in the cell. Otherwise, it is reserved.

SSB (Synchronization Signal/Physical Broadcast Channel) index: 6 bits. When the bits of the RA preamble index are all non-zeroes, the SSB indicator indicates an SSB used to determine an RACH occasion for PRACH transmission. Otherwise, it is reserved.

PRACH mask index: 4 bits. When the bits of the RA preamble index are all non-zeroes, the PRACH mask index indicates an RACH occasion associated with the SSB indicated by the SSB index. Otherwise, it is reserved.

Reserved: 10 bits

When DCI format 1_0 does not correspond to a PDCCH order, DCI format 1_0 includes fields used to schedule a PDSCH (e.g., a time domain resource assignment, a modulation and coding scheme (MCS), an HARQ process number, a PDSCH-to-HARQ_feedback timing indicator, and so on).

2-Step Random Access Procedure

In the prior art, random access is performed by a 4-step procedure as described above. In the legacy LTE system, an average of 15.5 ms is required for the 4-step random access procedure.

TABLE 5

| Component | Description | Time (ms) |
| --- | --- | --- |
| 1 | Average delay due to RACH scheduling period (1 ms RACH cycle) | 0.5 |
| 2 | RACH Preamble | 1 |
| 3-4 | Preamble detection and transmission of RA response (Time between the end RACH transmission and UE's reception of scheduling grant and timing adjustment) | 3 |
| 5 | UE Processing Delay (decoding of scheduling grant, timing alignment and C-RNTI assignment + L1 encoding of RRC Connection Request) | 5 |
| 6 | Transmission of RRC and NAS Request | 1 |
| 7 | Processing delay in eNB (L2 and RRC) | 4 |
| 8 | Transmission of RRC Connection Set-up (and UL grant) | 1 |

The NR system may require lower latency than conventional systems. When random access occurs in a U-band, the random access may be terminated, that is, contention may be resolved only if the UE and BS sequentially succeed in LBT in all steps of the 4-step random access procedure. If the LBT fails even in one step of the 4-step random access procedure, resource efficiency may decrease, and latency may increase. If the LBT fails in a scheduling/transmission process associated with Msg2 or Msg3, the resource efficiency may significantly decrease, and the latency may significantly increase. For random access in an L-band, low latency may be required in various scenarios of the NR system. Therefore, a 2-step random access procedure may be performed in the L-band as well.

To reduce latency in a random access procedure, the 2-step random access procedure may be used in the present disclosure.

As illustrated in FIG. 9(a), the 2-step random access procedure may include two steps: transmission of a UL signal (referred to as MsgA) from the UE to the BS and transmission of a DL signal (referred to as MsgB) from the BS to the UE.

The following description focuses on the initial access procedure, but the proposed methods may be equally applied to the random access procedure after the UE and BS establish an RRC connection. Further, a random access preamble and a PUSCH part may be transmitted together in a non-contention random access procedure as shown in FIG. 9(b).

While not shown, the BS may transmit a PDCCH for scheduling MsgB to the UE, which may be referred to as an MsgB PDCCH.

3. Physical Random Access Channel (PRACH) Transmission in U-Band

The above-described contents (e.g., NR frame structure, RACH, U-Band system, etc.) can be applied in conjunction with methods proposed in the present disclosure to be described later, or can be supplemented to clarify technical features of the methods proposed in the present disclosure.

In addition, the methods related to the PRACH preamble design to be described later relate to uplink (UL) transmission, and can be equally applied to the method for transmitting the uplink (UL) signal in the above-described U-band system (for use in the unlicensed band), and it should be understood that technical ideas proposed in the present disclosure can be modified or replaced according to terminology, expression, structures, etc. defined in each system so that the technical ideas can be implemented in the corresponding system.

For example, UL transmission through the methods related to the PRACH preamble design can be performed in an L-cell and/or a U-cell defined in the U-band system.

The Wi-Fi standard (802.11ac) specifies a CCA threshold of −62 dBm for non-Wi-Fi signals and a CCA threshold of −82 dBm for Wi-Fi signals. In other words, if a station (STA) or access point (AP) of the Wi-Fi system transmits no signal in a specific band if the STA or AP receives a signal from a device not included in the Wi-Fi system in the specific band at a power of −62 dBm or higher.

PRACH formats may include a long RACH format and a short RACH format. A PRACH with the long RACH format is configured with a length-839 sequence. A PRACH with the short RACH format is configured with a length-139 sequence. Hereinafter, the sequence structure of the short RACH format will be described. For frequency range 1 (FR1) below 6 GHz, the SCS of the short RACH format may be 15 and/or 30 KHz. The PRACH with the short RACH format may be transmitted in 12 RBs as shown in FIG. 10. The 12 RBs include 144 REs, and the PRACH may be transmitted over 139 tones (139 REs) of 144 REs. FIG. 10 shows that among 144 REs, two REs with the lowest indices and three REs with the highest indices are null tones, but the positions of the null tones may be different from those shown in FIG. 10.

In the present disclosure, a short RACH format may be referred to as a Short PRACH format, a long RACH format may be referred to as a Long PRACH format. The PRACH format may be referred to as a preamble format.

When a specific device (and/or a node) transmits signals in an unlicensed band (U-band), there may be restrictions in terms of Power Spectral Density (PSD). For example, according to ETSI regulations, signal transmission in a specific band should satisfy the PSD of 10 dBm/1 MHz. Considering that a bandwidth (BW) is set to about 2.1 MHz when the PRACH in which 15 kHz SCS is configured is transmitted in the same structure as those of FIG. 10, power of about 14 dBm may be maximum allowable power of the PRACH. In general, the maximum power of the UE may be 23 dBm, and 14 dBm corresponds to allowable power significantly lower than the UE maximum power of 23 dBm. If the UE transmits the UL signal at 14 dBm, a maximum UL coverage supportable by the UE may be reduced in size. If the UE increases transmission (Tx) power by transmitting the PRACH in a much larger frequency domain (F-domain) without transmitting the PRACH through 14 consecutive RBs, it can be helpful to prevent reduction of the UL coverage. In addition, as a regulation for the unlicensed band, there may be restrictions in terms of Occupied Channel Bandwidth (OCB). For example, when a specific device transmits a signal, this signal may occupy at least 80% of the system bandwidth. If the system bandwidth is 20 MHz, the signal transmitted by the specific device may occupy more than 16 MHz corresponding to 80% of 20 MHz.

Hereinafter, the PRACH preamble structure considering PSD and OCB regulations is proposed. Specifically, a PRACH sequence having a specific length is configured based on K PRBs, and is repeated in a frequency domain in consideration of the OCB, resulting in formation of a concatenated PRACH. When using the concatenated PRACH, the same PRACH sequence may be repeatedly transmitted. Through repeated transmission, PAPR (Peak to Average Power Ratio) and CM (Cube Metric) values may become higher. The lower the PAPR and CM values, the higher the transmission (Tx) performance. Hereinafter, during transmission of the concatenated PRACH in which the PRACH sequence is repeated in the frequency domain, methods for selecting a root index value and a CS value of the PRACH sequence for each iterative transmission in consideration of the PAPR and CM values are proposed.

In the present disclosure, a total number of repetition times of the PRACH sequence may be denoted by N_MAX. In addition, N_MAX sequences that are repeated in ascending numerical order of frequencies may be sequentially represented by Seq_#0, Seq_#1, . . . , Seq_#k, Seq_#N MAX-1.

However, the methods proposed in the present disclosure can also be applied to other use cases other than the NR U-band system. As an example of other use cases, methods based on the NR-based non-terrestrial network (NTN) according to the present disclosure can be used.

3.1. Embodiment 1

The same base sequence is used for each ZC (Zadoff-Chu) sequence to be repeatedly mapped, and the number of samples to be CS(cyclic shift)-processed for each ZC sequence can be applied differently to a specific number of ZC sequences. For example, among N_MAX ZC sequences, the number of CS samples may be applied differently to initial N ZC sequences, and the number of CS samples applied to the initial N ZC sequences can be repeatedly applied to the next N ZC sequences subsequent to the initial N ZC sequences. The fact that the same base sequence is applied to the respective ZC sequences may indicate that the respective ZC sequences are calculated based on the same root index. Here, the sequence and the ZC sequence may be mingled with each other.

Specifically, when there are ZC sequences that are repeatedly transmitted N_MAX times, the same root index can be applied to N_MAX ZC sequences. The number of CS samples may be applied differently to N sequences from among N_MAC ZC sequences. Preferably, the structure in which the cyclic shift (CS) sample values are spaced apart from each other at intervals of the same distance can be considered. When M bundles of N ZC sequences are constructed as represented by N_MAX=N*M, the sets of ZC sequences belonging to the M bundles may have the same pattern in the number of CS samples. In other words, N ZC sequences having different numbers of CS samples may be repeated M times, so that N_MAC ZC sequences can be constructed.

CS can be applied to a time domain sequence located at the front end of DFT (Discrete Fourier Transform). In addition, CS can also be applied to a frequency domain sequence located at the rear end of the DFT. Hereinafter, the CS applied to the time domain sequence located at the front end of the DFT will be described.

For example, a ZC sequence having the length of 139, which corresponds to the short ZC sequence from among sequences used in the PRACH can be used in a specific system (e.g., NR U-band and/or NTN system). Referring to FIG. 11, assuming that conditions of "N_MAX=4, N=2, M=2" are established and the spacing between the CS samples is denoted by alpha (α), a sequence corresponding to Seq_#0 may be CS-mapped at intervals of 0*alpha(α) samples, a sequence corresponding to Seq_#2 may be CS-mapped at intervals of 0*alpha(α) samples, and a sequence corresponding to Seq_#3 may be CS-mapped at intervals of 1*alpha(α) samples.

The number of CS samples for each sequence can also be used in the reverse order of numbers. Further, the order of the number of CS samples for each sequence can be determined at random. For example, when the conditions of "N_MAX=4, N=2, M=2" are established, the sequence corresponding to Seq_#0 may be CS-mapped at intervals of 0*alpha(α) samples, the sequence corresponding to Seq_#2 may be CS-mapped at intervals of 1*alpha(α) samples, and the sequence corresponding to Seq_#3 may be CS-mapped at intervals of 1*alpha(α) samples.

The number of values, each of which can be used as the alpha (α) value, may vary depending on the value of the sequence length. For example, when the sequence length is set to 139, the number of values, each of which can be used as the alpha (α) value, may be 138 from 1 to 138. FIG. 12 illustrates the PAPR and CM values when the alpha (α) value changes from 1 to 138 under the condition of "Sequence Length=139, N_MAX=4, and N=2". Specifically, FIG. 12 illustrates 95%-tile values on the PAPR and CM values that can be obtained when the root index is applied to all of 1 to 138 at NCS=11.

According to the experimental result of FIG. 13, when the CS corresponding to one sample (or 138 samples) is applied to Seq_#1 and Seq_#3 without being applied to Seq_#0 and Seq_#2 at N_MAX=4, the PAPR and CM values may appear more advantageous than other alpha (α) values. Here, the alpha (α) value may correspond to 1 or 138. Thus, in the case of N_MAX=4, it may be possible to use a method of applying cyclic shift (CS) corresponding to one sample (or 138 samples) to Seq_#1 and Seq#3 without applying the same CS to Seq_#0 and Seq#2 in the situation where the same root index is used in the respective sequences. In other words, the base sequence in which the same root index is used may be mapped to Seq_#0 and Seq_#2 without CS execution, and may be CS-mapped to Seq_#1 and Seq_#3 by one sample (or 138 samples).

According to the first embodiment (Embodiment 1), the UE may derive the root index and the NCS value based on PRACH configuration information received through higher layer signaling. The UE may create the ZC sequence using the derived root index and NCS value. The UE may receive the alpha (α) value from the base station (BS) through higher layer signaling. Here, the alpha (α) value may refer to a fixed value promised between the BS and the UE. In addition, the alpha (α) value may also be derived based on reception (Rx) information that was received by the UE through higher layer signaling. For example, if the root index value is 1-69 in the situation where the UE receives the root index value through a system information block (SIB), the alpha (α) value may be '1'. If the root index value is 70~138 the alpha (α) value may be 138. For example, the higher layer signaling may be RRC signaling. Preferably, higher layer signaling may be achieved by the SIB (System Information Block) from among RRC signaling.

The UE may map the previously generated ZC sequence to Seq_#0 without CS execution. The UE may map the previously generated ZC sequence to Seq_#1 by performing the CS corresponding to the alpha (a) sample. If N_MAX=4 and N=2 are established, the UE may map the previously generated ZC sequence to Seq_#2 without CS execution. The UE may apply the CS corresponding to the alpha (α) sample to the previously generated ZC sequence, and may map the resultant ZC sequence to Seq_#3.

The BS has already recognized that the UE repeatedly transmits sequences in the same manner as in Embodiment 1. Therefore, the BS can generate sequences from Seq_#0 to Seq_#N_MAX-1 using known values (i.e., root index, NCS, alpha ($\alpha$), and/or values). In addition, the BS may separately filter and/or decode each of the respective sequences, thereby obtaining a frequency diversity gain.

Hereinafter, the first embodiment (Embodiment 1) will be described in more detail.

Since the plurality of ZC sequences is repeatedly mapped in the frequency domain, one PRACH preamble signal can be constructed. The plurality of ZC sequences may be identical to N_MAX ZC sequences including Seq_#0, Seq_#1, . . . , Seq_#k, . . . , Seq_#N_MAX-1. In the following description, one PRACH preamble signal may be a PRACH preamble signal including only one index. The PRACH preamble signals having different indexes may be referred to as a plurality of PRACH preamble signals. The same base sequence can be used in the plurality of ZC sequences, and the entirety of the ZC sequences can be divided into a plurality of sequence groups. The number of sequence groups may be set to M. Different CS values may be applied to the respective ZC sequences belonging to one sequence group. If N=G_MAX is given, different CS values can be applied to G_MAX ZC sequences. ZC sequences belonging to one sequence group may be G_MAX ZC sequences including Seq_#0, Seq_#1, . . . , Seq_#k, Seq_#G_MAX-1. As described above, the operation of applying the same base sequence to the plurality of ZC sequences may indicate that the ZC sequences are generated based on the same root index. The operation of applying the CS value to ZC sequences may indicate that as many ZC sequences as the number of samples corresponding to the CS value are CS-processed.

If Seq_#0 is a reference sequence, Seq_#k can be generated and/or configured as a sequence to which the CS value corresponding to k*alpha samples based on the reference sequence Seq_#0 is applied. M sequence groups, each of which includes G MAX sequences, are generated and/or established, so that only one PRACH signal can be constructed. Preferably, if the ZC sequence has the length of 139, the alpha ($\alpha$) value may be determined to be 1 (or 138). If N_MAX=4 is established, G_MAX=2 and M=2 can be decided.

As many CSs as the number of N cs samples can be applied to the plurality of ZC sequences constructing different PRACH preamble signals. For example, if the m-th sequence from among the ZC sequences constructing the PRACH preamble having a PRACH preamble index (Z) is Seq_#m, this sequence Seq_#m is a sequence to which the CS value corresponding to n*$N_{CS}$ samples based on the m-th sequence Seq_#m from among the ZC sequences constructing the PRACH preamble having a PRACH preamble index (Z-n) is applied, so that the resultant sequence Seq_#m can be generated and/or configured. For example, $N_{CS}$ may be set to 11 as represented by $N_{CS}$=11.

The plurality of ZC sequences constructing only one PRACH preamble signal can be sequentially mapped in ascending numerical order from the ZC sequence having the lowest sequence index, that is, can be sequentially mapped in the direction from a low frequency to a high frequency. In addition, the plurality of ZC sequences constructing one PRACH preamble signal may be sequentially mapped in descending numerical order from the ZC sequence having the highest sequence index, that is, can be sequentially mapped in the direction from a high frequency to a low frequency. In addition, the plurality of ZC sequences constructing one PRACH preamble signal may be mapped regardless of the order of sequence indexes and frequency information as to whether the frequency is high or low.

The PRACH preamble composed of the plurality of sequences may be referred to as a multi-sequence preamble. The multi-sequence preamble to which a specific $N_{CS}$ value is applied may be configured and/or transmitted as one PRACH preamble signal. In association with the multi-sequence preamble to which the specific $N_{CS}$ value and another $N_{CS}$ value are applied, each sequence constructing the corresponding multi-sequence preamble may be configured and/or transmitted as one PRACH preamble signal. Each sequence constructing the multi-sequence preamble may be referred to as a single-sequence preamble. For example, for an initial random access process or a contention based random access process, the UE may be configured to select and/or transmit only the multi-sequence preamble. The initial random access may refer to random access that is performed in the idle mode by the UE. In addition, for either the random access process or the contention-free random access process in the connected mode, the single-sequence preamble can be selected and/or transmitted. For the random access process or the contention-free random access process in the connected mode, the UE may be configured to select and/or transmit not only the single-sequence preamble but also the multi-sequence preamble.

3.2. Embodiment 2

The same base sequence may be applied to the respective ZC (Zadoff-Chu) sequences that are repeatedly mapped, and the number of CS samples may be differently applied to the respective ZC sequences. In addition, the phase shift (PS) can be differently applied to the respective ZC sequences.

Alternatively, the same base sequence may be applied to the respective ZC sequences that are repeatedly mapped, and the number of CS samples for each ZC sequence may be applied differently to a specific number of ZC sequences. For example, the number of CS samples can be differently applied to the initial N ZC sequences from among N_MAX ZC sequences, and the number of CS samples applied to the initial N ZC sequences can be repeatedly applied to the next N ZC sequences subsequent to the initial N ZC sequences. In addition, the phase shift (PS) of the ZC sequences can be differently applied to the specific number of ZC sequences. For example, different phase shift (PS) values may be applied to the initial N ZC sequences from among the N_MAX ZC sequences, and the phase shift (PS) applied to the initial N ZC sequences can be repeatedly applied to the next N ZC sequences subsequent to the initial N ZC sequences.

Specifically, in the situation where different CS values are applied to the respective sequences in which the same base sequence is used, different PS values may be additionally applied to the respective sequences, so that the PRACH signal can be constructed/mapped based on the plurality of sequences. In other words, since the single PRACH signal includes the plurality of sequences, and the single PRACH signal can be configured and/or transmitted by applying and/or mapping a combination of different CSs and different PSs to the respective sequences. For example, the PS value (Y) may be further applied to a specific sequence to which the CS value (X) is applied. In addition, different {CS X, PS Y} combinations can be applied to the respective sequences.

CS may be applied to the time domain sequence located at the front end of the DFT (Discrete Fourier Transform). In addition, the CS may also be applied to the frequency domain sequence located at the rear end of the DFT. Hereinafter, the CS applied to the time domain sequence located at the front end of the DFT will be described in detail.

PS may be applied to the frequency domain sequence located at the rear end of the DFT. In addition, the CS may also be applied to the time domain sequence located at the front end of the DFT. Hereinafter, the CS applied to the time domain sequence located at the front end of the DFT will be described in detail. The PS may be implemented by multiplying the same phase shift (PS) value to each of elements and/or samples constructing only one sequence. The PS may also be implemented by multiplying the same PS value by subcarriers mapped to the respective elements and/or samples constructing one sequence. For example, "PS=a" is multiplied by L elements constructing the sequence having the length of L and/or the set of samples [s_0, s_1, . . . , s_(L−1)], so that sequences to which the phase shift (PS) is applied can be generated as [eja*s_0, eja*s_1, eja*s_(L−1)]. Hereinafter, the PS applied to the time domain sequence located at the rear end of the DFT will be described in detail.

A method for shifting one sample having the best PAPR and CM performance described in Embodiment 1 can be applied to the CS value. Four PS values (1+0i, 0+1i, −1+0i, 0−1i) can be used as the PS value.

For example, if the number of sequences that are repeatedly mapped and/or transmitted is set to 4, it is assumed that CS or PS to be applied to a first sequence acting as the initial sequence is not present, so that the number of cases capable of being allocated to the remaining three sequences can be calculated. The first sequence may refer to a sequence that is mapped to the lowest frequency band from among the four sequences. The CS value may be any one of 0 and 1 and the PS value may be any one of the four PS values (1+0i, 0+1i, −1+0i, 0−1i), so that the number of combinations of the number of cases capable of being allocated to the remaining three sequences may be 512, as represented by "(2*2*2)* (4*4*4) =512". In Embodiment 2, from among 512 cases, the CS and PS values having the best PAPR and CM performance are proposed.

As shown in FIG. 13, in the case where the PRACH sequence corresponding to 12 RBs is repeated four times at 30 kHz SCS, 30 cases from among 512 cases are arranged in descending numerical order of CM performances. A spacing of one RB (1 RB) may be present between RBs to which sequences are mapped. In FIG. 13, Rn may refer to a sequence that is repeated N times. For example, R1 may refer to the first sequence, and R4 may refer to the fourth sequence. 'CS=0' may indicate that the CS corresponding to 0 samples is applied to the corresponding sequence. That is, 'CS=0' indicates that the CS is not applied. 'CS=1' may indicate that the CS corresponding to one sample (1 sample) is applied to the corresponding sequence. In addition, 'PS=1+0i' may indicate that the PS is not applied to the corresponding sequence. 'PS=0+1i' may indicate that the phase shift (PS) of 90 degrees is applied to the corresponding sequence. 'PS=−1+0i' may indicate that the phase shift (PS) of 180 degrees is applied to the corresponding sequence. 'PS=0−1i' may indicate that the phase shift (PS) of 270 degrees (i.e., −90 degrees) is applied to the corresponding sequence.

As shown in FIG. 14, in the case where the PRACH sequence corresponding to 12 RBs is repeated four times at 15 kHz SCS, 30 cases from among 512 cases are arranged in descending numerical order of CM performances. A spacing of 13 RBs may be present between RBs to which sequences are mapped. In FIG. 14, Rn may refer to a sequence that is repeated N times. For example, R1 may refer to the first sequence, and R4 may refer to the fourth sequence. 'CS=0' may indicate that the CS corresponding to 0 sample is applied to the corresponding sequence. That is, 'CS=0' indicates that the CS is not applied. 'CS=1' may indicate that the CS corresponding to one sample (1 sample) is applied to the corresponding sequence. In addition, 'PS=1+0i' may indicate that the PS is not applied to the corresponding sequence. 'PS=0+1i' may indicate that the phase shift (PS) of 90 degrees is applied to the corresponding sequence. 'PS=−1+0i' may indicate that the phase shift (PS) of 180 degrees is applied to the corresponding sequence. 'PS=0−1i' may indicate that the phase shift (PS) of 270 degrees (i.e., −90 degrees) is applied to the corresponding sequence.

Combinations included in FIGS. 13 and 14 may have superior PAPR and CM performance as compared to the PRACH of the legacy NR system. In Embodiment 2, upper three combinations capable of obtaining the best results from both of the experimental result of FIG. 13 and the experimental result of FIG. 14 can be proposed as the available CS and PS values that can be applied to the case where four sequences are repeatedly mapped and/or transmitted. In FIGS. 13 and 14, indexes #341, #242, and #368 can be proposed as the CS and PS values that can be applied to the respective sequences when four sequences are repeatedly mapped and/or transmitted. The combination of ZC sequences corresponding to three indexes is as follows.

1. Proposed Combination #1-1 (Index 341)
1-A. First ZC sequence
Presence of Cyclic shift. Absence of Phase shift (i.e., 0° shift)
1-B. Second ZC sequence
Cyclic shift 1 sample. Phase shift 0+1i (i.e., 90° shift).
1-C. Third ZC sequence
Absence of Cyclic shift. Phase shift 0+1i (i.e., 90° shift).
1-D. Fourth ZC sequence
Cyclic shift 1 sample. Absence of Phase shift (i.e., 0° shift).
2. Proposed Combination #1-2 (Index 242)
2-A. First ZC sequence
Presence of Cyclic shift. Absence of Phase shift (i.e., 0° shift).
2-B. Second ZC sequence
Absence of Cyclic shift. Phase shift 0−1i (i.e., 270° (−90°) shift).
2-C. Third ZC sequence
Cyclic shift 1 sample. Absence of Phase shift (i.e., 0° shift).
2-D. Fourth ZC sequence
Cyclic shift 1 sample. Phase shift 0+1i (i.e., 90° shift).
3. Proposed Combination #1-3 (Index 368)
3-A. First ZC sequence
Absence of Cyclic shift. Absence of Phase shift (i.e., 0° shift)
3-B. Second ZC sequence
Cyclic shift 1 sample. Phase shift −1+0i (i.e., 180° shift).
3-C. Third ZC sequence
Absence of Cyclic shift. Phase shift 0−1i (i.e., 270°(−90°) shift).
3-D. Fourth ZC sequence
Cyclic shift 1 sample. Phase shift 0−1i (i.e., 270°(−90°) shift).

In the proposed three combinations of sequences, the sequence mapped to the lowest frequency band may correspond to the first ZC sequence, and the sequence mapped to the highest frequency band may correspond to the fourth ZC sequence. Alternatively, the sequence mapped to the highest frequency band may correspond to the first ZC sequence, and the sequence mapped to the lowest frequency band may correspond to the fourth ZC sequence. In each of the combinations, the CS may refer to the CS value that is additionally applied based on the first ZC sequence. For example, when the first ZC sequence is previously given and/or the configured CS value (a) is applied/generated, "Cyclic Shift b sample" may indicate that the CS value (a+b) is applied to generate the corresponding ZC sequence. 'Absence of Cyclic Shift' may indicate that the CS value (a) is applied to generate the corresponding ZC sequence.

The methods proposed by Combinations #1-1 to #1-3 can be generalized as shown in FIG. 15. Additionally, the method of mapping the sequence to the proposed combination #1-1 can be represented as shown in FIG. 16. The method of mapping the sequence to the proposed combination #1-2 can be represented as shown in FIG. 17. The method of mapping the sequence to the proposed combination #1-3 can be represented as shown in FIG. 18.

As another example, if the number of sequences that are repeatedly mapped and/or transmitted is set to 8, it is assumed that the CS and PS values to be applied to the first sequence are not present, so that the number of cases capable of being allocated to the remaining seven sequences can be calculated. The first sequence may be a sequence that is mapped to the lowest frequency band from among 8 sequences. The CS value may be any one of 0 and 1, and the PS value may be any one of 1+0i, 0+1i, 31 1+0i, and 0-1i. The number of combinations of the number of cases capable of being allocated to the remaining seven sequences may be 2,097,152, as represented by "(2*2*2*2*2*2*2)* (4*4*4*4*4*4*4)=2,097,152". From among 2,097,152 cases, experiments capable of obtaining the best PAPR and CM performance are classified into two stages, so that the experiments are divisionally performed in the two stages. Firstly, 17 cases having the best performance may be selected from among 16384 cases (4*4*4*4*4*4*4=16,384) generated when only the PS is applied. Secondly, 128 (2*2*2*2*2*2*2=128) performance obtained when the CS is applied to the selected 17 cases may be measured. The experiments for a total of 2176 cases have been performed, and the CS and PS values having the best PAPR and CM performance are proposed based on the experimental results.

As shown in FIG. 19, in the case where the PRACH sequence corresponding to 12 RBs is repeated eight times at 15 kHz SCS, 20 cases from among 2176 cases are arranged in descending numerical order of CM performances. A spacing of one RB (1 RB) may be present between RBs to which sequences are mapped. In FIG. 19, Rn may refer to a sequence that is repeated N times. For example, R1 may refer to the first sequence, and R4 may refer to the fourth sequence. 'CS=0' may indicate that the CS corresponding to 0 samples is applied to the corresponding sequence. That is, 'CS=0' indicates that the CS is not applied. 'CS=1' may indicate that the CS corresponding to one sample (1 sample) is applied to the corresponding sequence. In addition, 'PS=1+0i' may indicate that the PS is not applied to the corresponding sequence. 'PS=0+1i' may indicate that the phase shift (PS) of 90 degrees is applied to the corresponding sequence. 'PS=−1+0i' may indicate that the phase shift (PS) of 180 degrees is applied to the corresponding sequence. 'PS=0−1i' may indicate that the phase shift (PS) of 270 degrees (i.e., −90 degrees) is applied to the corresponding sequence.

Combinations included in FIG. 19 may have superior PAPR and CM performance as compared to the PRACH of the legacy NR system. In this embodiment, upper two combinations capable of obtaining the best results from the experimental results of FIG. 19 can be proposed as the available CS and PS values that can be applied to the case where eight sequences are repeatedly mapped and/or transmitted. The combination of ZC sequences corresponding to two index combinations is as follows.

1. Proposed Combination #2-1 (PS index 5781 & CS index 86)
   1-A. First ZC sequence
       Absence of Cyclic shift. Absence of Phase shift (i.e., 0° shift).
   1-B. Second ZC sequence
       Cyclic shift 1 sample. Phase shift 0+1i (i.e., 90° shift).
   1-C. Third ZC sequence
       Absence of Cyclic shift. Phase shift 0+1i (i.e., 90° shift).
   1-D. Fourth ZC sequence
       Cyclic shift 1 sample. Phase shift −1 (i.e., 180° shift).
   1-E. Fifth ZC sequence
       Absence of Cyclic shift. Phase shift −1 (i.e., 180° shift).
   1-F. Sixth ZC sequence
       Cyclic shift 1 sample. Phase shift 0+1i (i.e., 90° shift).
   1-G. Seventh ZC sequence
       Absence of Cyclic shift. Phase shift 0+1i (i.e., 90° shift).
   1-H. Eighth ZC sequence
       Cyclic shift 1 sample. Absence of Phase shift (i.e., 0° shift).

2. Proposed Combination #2-2 (PS index 5781 & CS index 52)
   2-A. First ZC sequence
       Absence of Cyclic shift. Absence of Phase shift (i.e., 0° shift).
   2-B. Second ZC sequence
       Absence of Cyclic shift. Phase shift 0+1i (i.e., 90° shift).
   2-C. Third ZC sequence
       Cyclic shift 1 sample. Phase shift 0+1i (i.e., 90° shift).
   2-D. Fourth ZC sequence
       Cyclic shift 1 sample. Phase shift −1 (i.e., 180° shift).
   2-E. Fifth ZC sequence
       Absence of Cyclic shift. Phase shift −1 (i.e., 180° shift).
   2-F. Sixth ZC sequence
       Absence of Cyclic shift. Phase shift 0+1i (i.e., 90° shift).
   2-G. Seventh ZC sequence
       Cyclic shift 1 sample. Phase shift 0+1i (i.e., 90° shift).
   2-H. Eighth ZC sequence
       Cyclic shift 1 sample. Absence of Phase shift (i.e., 0° shift).

In the proposed two combinations of sequences, the sequence mapped to the lowest frequency band may correspond to the first ZC sequence, and the sequence mapped to the highest frequency band may correspond to the eighth ZC sequence. Alternatively, the sequence mapped to the highest frequency band may correspond to the first ZC sequence, and the sequence mapped to the lowest frequency band may correspond to the eighth ZC sequence. In each of the combinations, the CS may refer to the CS value that is additionally applied based on the first ZC sequence. For example, when the first ZC sequence is previously given and/or the configured CS value (a) is applied/generated, "Cyclic Shift b sample" may indicate that the CS value (a+b) is applied to generate the corresponding ZC sequence. 'Absence of Cyclic Shift' may indicate that the CS value (a) is applied to generate the corresponding ZC sequence.

The methods proposed by Combinations #2-1 and #2-2 can be generalized as shown in FIG. 20. Additionally, the method of mapping the sequence to the proposed combination #2-1 can be represented as shown in FIG. 21. The method of mapping the sequence to the proposed combination #2-2 can be represented as shown in FIG. 22. The method of mapping the sequence to the proposed combination #3 can be represented as shown in FIG. 18.

In Embodiments 1 and 2, the root index and the CS value capable of being selected by each UE for the PRACH sequence transmitted to a specific frequency band are always configured differently according to the preamble index value. Therefore, in the proposed embodiments, there is no problem for the UE to discriminate between PRACH sequences received from the plurality of UEs. In addition, the proposed embodiments can provide the same PRACH capacity as PRACH capacity supported by the conventional NR system.

Moreover, the operation of applying the embodiments related to the proposed sequences is not limited to the PRACH preamble signal structure. Even when one UL channel/signal is composed of the plurality of sequences (for example, a DMRS signal used for PUSCH demodulation, a DMRS signal used for PUCCH demodulation, a sequence where UCI information is loaded on PUCCH resources, and a sequence constructing the SRS signal), the proposed principles/methods of the embodiments proposed in the present disclosure can be applied in the same/similar manner.

In addition, although the proposed embodiments are described based on the uplink (UL) situation, the proposed embodiment can also be applied to repeated transmission in the frequency domain in the DL situation. For example, the proposed embodiments can be applied to the case where WUS sequences are FDM-processed in eMTC/NB-IoT (with particular purposes such as UE grouping). That is, since the term WUS is related to DL (BS →UE), the transmission (Tx) end and the reception (Rx) end may be replaced with each other in comparison with PRACH transmission of the proposed embodiments. However, assuming that the BS performs the UE behavior and the UE performs the BS behavior, no problems may occur in the proposed embodiments.

Although the proposed embodiments have been described based on the ZC sequences, it should be noted that the proposed embodiments can also be applied to the environments in which other sequences are used. For example, if the base sequence is an M-sequence, the root index of the ZC sequence is not changed to another, and an initial value of a linear feedback shift register (LFSR) of the M-sequence is changed to another, so that the proposed embodiments can be applied to the changed values. Of course, the proposed embodiments can also be applied to the CS of the M-sequence.

In addition to the proposed embodiments, when the corresponding sequence is mapped to the frequency domain at the rear end of the DFT stage, the method of changing the mapping order may be considered as needed. For example, assuming that the proposed embodiments relate to forward mapping, reverse mapping opposite to the forward mapping can be used as needed.

In addition, since examples of the above-described proposals can also be used as implementation methods of the present disclosure, it will also be apparent that the examples of the above-described proposals may be considered to be a kind of proposed methods. Although the above-described proposals can be implemented independently from each other, it should be noted that the above-described proposals can also be implemented in a combination (or a merged format) of some proposals. Rules can be defined in a manner that information about whether the above-described proposed methods are applied (or information about the rules of the proposed methods) can be signaled from the BS to the UE through pre-defined signaling (e.g., physical layer signaling or higher layer signaling).

Implementation Examples

One or more operations from among the above-described operations may be organically combined to implement some embodiments.

One of the embodiments that can be implemented by a combination of the above-described operations may be identical to those of FIG. 23.

The UE may transmit a PRACH to the BS (S2601), and may receive a random access response (RAR) corresponding to the PRACH from the BS (S2603). Although not shown in the drawings, from the viewpoint of the BS, the BS may receive the PRACH from the UE, and may transmit the RAR corresponding to the PRACH to the UE.

The PRACH transmitted between the BS and the UE may be identical in structure to the PRACH structure proposed in the embodiments of the present disclosure. For example, the PRACH transmitted between the BS and the UE may be composed of N_MAX sequences mapped to the frequency domain. The N_MAX sequences may construct M groups (or M bundles) each having N sequences (N_MAX=N*M). In this case, all of the N_MAX sequences may have the same length. The same sequence length that can be allocated to the N_MAX sequences may be 139. In other words, when there are N_MAX sequences, the length of one sequence may be 139. Therefore, a total length of N_MAX sequences may be denoted by 139*N_MAX. The N_MAX sequences may be generated based on the same base sequence. In addition, other CS (cyclic shift) values can be applied to the N sequences as needed. The pattern of other CS values applied to N sequences may be equally applied to M groups. In other words, N sequences may be included in each of M groups, and the CS value applied to the k-th sequence from among the N sequences may be equally applied to the k-th sequences belonging to different groups. Preferably, according to Embodiment 1, N may be set to any of other values instead of '1' and 'N_MAX' values.

In addition, the PS value may be separately applied to the N_MAX sequences. For example, the PS value applied to the first sequence from among the N_MAX sequences may be different from the PS value applied to the second sequence from among the N_MAX sequences. The PS values applied to the respective sequences are different from each other, so that the PS value applied to the first sequence may be identical to or different from the PS value applied to the second sequence. Accordingly, in addition to operations of the first embodiment (Embodiment 1), the PS values may be further applied to the respective sequences, so that the second embodiment (Embodiment 2) can be carried out.

The CS and PS values may be determined based on the sequence length, the N_MAX value, and the PAPR and/or CM value. The sequence length may be 139 as described above. For example, according to the N_MAX value as shown in the above-described experimental results, the PAPR and/or CM value that can be allocated to a specific combination of the CS and PS values may be changed for the sequence having the length of 139.

If N_MAX is set to 4 (i.e., N_MAX=4), the combination of sequences corresponding to N_MAX=4 may be one of the above-described combinations #1-1 to #1-3. According to the proposed combination #1-1, CS=0 and PS=0 may be applied to the first sequence from among the N_MAX sequences, the CS value of 1 sample and the PS value of may be applied to the second sequence, the CS value of 0 samples and the PS value of may be applied to the third sequence, and the CS value of 1 sample and the PS value of '0' may be applied to the fourth sequence. According to the proposed combination #1-2, CS=0 and PS=0 may be applied to the first sequence from among the N_MAX sequences, the CS value of zero '0' and the PS value of 0-1i may be applied to the second sequence, the CS value of 1 sample and the PS value of zero '0' may be applied to the third sequence, and the CS value of 1 sample and the PS value of 0+1i may be applied to the fourth sequence. According to the proposed combination #1-3, CS=0 and PS=0 may be applied to the first sequence from among the N_MAX sequences, the CS value of 1 sample and the PS value of '−1' may be applied to the second sequence, the CS value of zero '0' and the PS value of 0-1i may be applied to the third sequence, and the CS value of 1 sample and the PS value of 0-1i may be applied to the fourth sequence.

If N_MAX is set to 8 (i.e., N MAX=8), the combination of sequences corresponding to N_MAX=8 may be one of the above-described combinations #2-1 and #2-2. According to the proposed combination #2-1, CS=0 and PS=0 may be applied to the first sequence from among the N_MAX sequences, the CS value of 1 sample and the PS value of may be applied to the second sequence, the CS value of 0 samples and the PS value of may be applied to the third sequence, the CS value of 1 sample and the PS value of '−1' may be applied to the fourth sequence, the CS value of 0 samples and the PS value of '−1' may be applied to the fifth sequence, the CS value of 1 sample and the PS value of 0+1i may be applied to the sixth sequence, the CS value of 0 samples and the PS value of 0+1i may be applied to the seventh sequence, and the CS value of 1 sample and the PS value of zero '0' may be applied to the eighth sequence. According to the proposed combination #2-2, CS=0 and PS=0 may be applied to the first sequence from among the N_MAX sequences, the CS value of zero '0' and the PS value of 0+1i may be applied to the second sequence, the CS value of 1 sample and the PS value of 0+1i may be applied to the third sequence, the CS value of 1 sample and the PS value of '−1' may be applied to the fourth sequence, the CS value of zero '0' and the PS value of '−1' may be applied to the fifth sequence, the CS value of zero '0' and the PS value of 0+1i may be applied to the sixth sequence, the CS value of 1 sample and the PS value of 0+1i may be applied to the seventh sequence, and the CS value of 1 sample and the PS value of zero '0' may be applied to the eighth sequence.

In addition to the above-described operation of FIG. 23, one or more of the operations described before with reference to FIGS. 1 to 22 may further be performed in combination.

Example of Communication System to Which the Present Disclosure is Applied

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

FIG. 24 illustrates a communication system 1 applied to the present disclosure.

Referring to FIG. 24, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Example of Wireless Device to Which the Present Disclosure is Applied

FIG. 25 illustrates wireless devices applicable to the present disclosure.

Referring to FIG. 25, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 24.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Example of Use of Wireless Device to Which the Present Disclosure is Applied

FIG. 26 illustrates another example of a wireless device applied to the present disclosure. The wireless device may be implemented in various forms according to a use case/service (refer to FIG. 24).

Referring to FIG. 26, wireless devices 100 and 200 may correspond to the wireless devices 100 and 200 of FIG. 25 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 25. For example, the transceiver(s) 114 may include the one or more transceivers 106 and 206 and/or the one or more antennas 108 and 208 of FIG. 25. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 24), the vehicles (100b-1 and 100b-2 of FIG. 24), the XR device (100c of FIG. 24), the hand-held device (100d of FIG. 24), the home appliance (100e of FIG. 24), the IoT device (100f of FIG. 24), a digital broadcasting terminal, a hologram device, a public safety device, an MTC device, a medical device, a FinTech device (or a finance device), a security device, a climate/environment device, the AI server/device (400 of FIG. 24), the BSs (200 of FIG. 24), a network node, or the like. The wireless device may be mobile or fixed according to a use case/service.

In FIG. 26, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Example of Vehicle or Autonomous Driving Vehicle to Which the Present Disclosure is Applied FIG. 27 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 27, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 27, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

As described above, the present disclosure is applicable to various wireless communication systems.

What is claimed is:

1. A method for enabling a user equipment (UE) to transmit and receive signals in a wireless communication system comprising:
transmitting a physical random access channel (PRACH); and
receiving a random access response (RAR) based on the PRACH,
wherein
the PRACH includes N MAX sequences mapped to a frequency domain,
wherein
the N_MAX sequences construct M groups each including N sequences, and the N_MAX sequences have the same length; and
the N_MAX sequences are generated based on the same base sequence, different cyclic shift (CS) values are applied to the N sequences, and the pattern of the different CS values is equally applied to the M groups;
a phase shift (PS) value is separately applied to each of the N_MAX sequences, wherein:
the N_MAX value is set to 4;
from among the N_MAX sequences,
the CS value of '0' and the PS value of '0' are applied to a first sequence, the CS value corresponding to 1 sample and the PS value of '0+1i' are applied to a second sequence, the CS value of '0' and the PS value of '0+1i' are applied to a third sequence, and the CS value corresponding to 1 sample and the PS value of '0' are applied to a fourth sequence;
the CS value of '0' and the PS value of '0' are applied to the first sequence, the CS value of '0' and the PS value of '0-1i' are applied to the second sequence, the CS value corresponding to 1 sample and the PS value of '0' are applied to the third sequence, and the CS value corresponding to 1 sample and the PS value of '0+1i' are applied to the fourth sequence; and
the CS value of '0' and the PS value of '0' are applied to the first sequence, the CS value corresponding to 1 sample and the PS value of '−1' are applied to the second sequence, the CS value of '0' and the PS value of '0-1i' are applied to the third sequence, and the CS value corresponding to 1 sample and the PS value of '0-1i' are applied to the fourth sequence.

2. The method according to claim 1, wherein:
the (CS) CS value and PS value are determined based on and a Peak to Average Power Ratio (PAPR) and Cube Metric (CM) value.

3. A user equipment (UE) configured to transmit and receive signals in a wireless communication system comprising:
at least one transceiver;
at least one processor; and
at least one memory operatively connected to the at least one processor, and configured to store instructions such that the at least one processor performs specific operations by executing the instructions,
wherein the specific operations include:
transmitting a physical random access channel (PRACH); and
receiving a random access response (RAR) based on the PRACH,
wherein
the PRACH includes N_MAX sequences mapped to a frequency domain, wherein
the N_MAX sequences construct M groups each including N sequences, and the N_MAX sequences have the same length; and
the N_MAX sequences are generated based on the same base sequence, different cyclic shift (CS) values are applied to the N sequences, and the pattern of the different CS values is equally applied to the M groups;
a phase shift (PS) value is separately applied to each of the N MAX sequences, wherein:
the N_MAX value is set to 4;
from among the N_MAX sequences,
the CS value of '0' and the PS value of '0' are applied to a first sequence, the CS value corresponding to 1 sample and the PS value of '0+1i' are applied to a second sequence, the CS value of '0' and the PS value of '0+1i' are applied to a third sequence, and the CS value corresponding to 1 sample and the PS value of '0' are applied to a fourth sequence;
the CS value of '0' and the PS value of '0' are applied to the first sequence, the CS value of '0' and the PS value of '0-1i' are applied to the second sequence, the CS value corresponding to 1 sample and the PS value of '0' are applied to the third sequence, and the CS value corresponding to 1 sample and the PS value of '0+1i' are applied to the fourth sequence; and
the CS value of '0' and the PS value of '0' are applied to the first sequence, the CS value corresponding to 1 sample and the PS value of '−1' are applied to the second sequence, the CS value of '0' and the PS value of '0-1i' are applied to the third sequence, and the CS value corresponding to 1 sample and the PS value of '0-1i' are applied to the fourth sequence.

4. The user equipment (UE) according to claim 3, wherein:
the CS value and the PS value are determined based on a Peak to Average Power Ratio (PAPR) and Cube Metric (CM) value.

5. A device configured to operate for a user equipment (UE) comprising:
at least one processor; and
at least one memory operatively connected to the at least one processor, and configured to store instructions such that the at least one processor performs specific operations by executing the instructions,
wherein the specific operations include:
transmitting a physical random access channel (PRACH); and
receiving a random access response (RAR) based on the PRACH,
wherein
the PRACH includes N_MAX sequences mapped to a frequency domain,
wherein
the N_MAX sequences construct M groups each including N sequences, and the N_MAX sequences have the same length; and
the N_MAX sequences are generated based on the same base sequence, different cyclic shift (CS) values are applied to the N sequences, and the pattern of the different CS values is equally applied to the M groups:,
a phase shift (PS) value is separately applied to each of the N_MAX sequences,
wherein:
the N_MAX value is set to 4;
from among the N_MAX sequences,
the CS value of '0' and the PS value of '0' are applied to a first sequence, the CS value corresponding to 1 sample and the PS value of '0+1i' are applied to a second sequence, the CS value of '0' and the PS value of '0+1i' are applied to a third sequence, and the CS value corresponding to 1 sample and the PS value of '0' are applied to a fourth sequence;
the CS value of '0' and the PS value of '0' are applied to the first sequence, the CS value of '0' and the PS value of '0-1i' are applied to the second sequence, the CS value corresponding to 1 sample and the PS value of '0' are applied to the third sequence, and the CS value corresponding to 1 sample and the PS value of '0+1i' are applied to the fourth sequence; and
the CS value of '0' and the PS value of '0' are applied to the first sequence, the CS value corresponding to 1 sample and the PS value of '−1' are applied to the second sequence, the CS value of '0' and the PS value of '0-1i' are applied to the third sequence, and the CS value corresponding to 1 sample and the PS value of '0-1i' are applied to the fourth sequence.

6. The device according to claim 5, wherein:
the CS value and the PS value are determined based on a Peak to Average Power Ratio (PAPR) and Cube Metric (CM) value.

* * * * *